US012772226B2

(12) United States Patent
Lei et al.

(10) Patent No.: US 12,772,226 B2
(45) Date of Patent: Oct. 20, 2026

(54) ENHANCEMENTS OF SMALL DATA TRANSMISSION

(71) Applicant: QUALCOMM Incorporated, San Diego, CA (US)

(72) Inventors: Jing Lei, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 18/403,331

(22) Filed: Jan. 3, 2024

(65) Prior Publication Data

US 2025/0220658 A1 Jul. 3, 2025

(51) Int. Cl.

| | |
|---|---|
| ***H04W 72/0457*** | (2023.01) |
| ***H04W 72/11*** | (2023.01) |
| ***H04W 72/231*** | (2023.01) |
| ***H04W 76/20*** | (2018.01) |

(52) U.S. Cl.

CPC ........ *H04W 72/0457* (2023.01); *H04W 72/11* (2023.01); *H04W 72/231* (2023.01); *H04W 76/20* (2018.02)

(58) Field of Classification Search

CPC ............. H04W 72/0457; H04W 72/11; H04W 72/231; H04W 76/20; H04W 72/0453; H04L 5/001; H04L 5/0053; H04L 5/0098

See application file for complete search history.

(56) References Cited

U.S. PATENT DOCUMENTS

2022/0360381 A1* 11/2022 Lei ........................ H04L 5/0037

OTHER PUBLICATIONS

International Search Report and Written Opinion—PCT/US2024/057327—ISA/EPO—Mar. 13, 2025.

Moderator (AT&T): “Summary of UE Features For BWP Without Restriction”, 3GPP TSG RAN WG1 #112bis-e, R1-2303653, 3rd Generation Partnership Project, Mobile Competence Centre, 650, Route Des Lucioles, F-06921, Sophia-Antipolis Cedex, France, vol. 3GPP RAN 1, No. e-Meeting, Apr. 17, 2023-Apr. 26, 2023, Apr. 26, 2023, 15 Pages, XP052368651, The Whole Document.

Nokia, et al., “On FG 6-1a BWP Without Restriction”, 3GPP TSG RAN WG1 #110, R1-2206427, 3rd Generation Partnership Project, Mobile Competence Centre, 650, Route Des Lucioles, F-06921, Sophia-Antipolis Cedex, France, vol. RAN WG1, No. Toulouse, France, Aug. 22, 2022-Aug. 26, 2022, Aug. 12, 2022, 8 Pages, XP052274359, The Whole Document.

Qualcomm Incorporated: “BW Reduction for RedCap UE”, 3GPP TSG-RAN WG1 Meeting #106bis-e, R1-2110193, 3rd Generation Partnership Project, Mobile Competence Centre, 650, Route Des Lucioles, F-06921, Sophia-Antipolis Cedex, France, vol. RAN WG1, No. e-Meeting, Oct. 11, 2021-Oct. 19, 2021, Oct. 2, 2021, 28 Pages, XP052059129, section 2.

* cited by examiner

*Primary Examiner* — Eric Myers

(74) *Attorney, Agent, or Firm* — Procopio, Cory, Hargreaves & Savitch LLP/Qualcomm

(57) ABSTRACT

A method for wireless communication at a UE and related apparatus are provided. In the method, the UE configures a pair of unrestricted BWPs for communication with a network entity. The pair of unrestricted BWPs includes an unrestricted UL BWP and an unrestricted DL BWP. The UE further performs, based on at least one of the unrestricted UL BWP or the unrestricted DL BWP, a BWP operation for the communication with the network entity. The BWP operation includes one or more of a BWP switch or an SDT with the network entity.

30 Claims, 15 Drawing Sheets

One Frame (TDD)
10 ms
subframe
slot
RB
200
subcarrier
OFDM symbol
DMRS R
CSI-RS

230
PDCCH CORESET
SSS
PSS
PDSCH
PBCH
REG 12 REs
1 CCE = 6 REGs
SS/PBCH Block
BWP
20 RBs
channel bandwidth RBs 250
SRS
SRS Comb 0
SRS Comb 1

280
PUCCH
PUSCH

ENHANCEMENTS OF SMALL DATA TRANSMISSION

TECHNICAL FIELD

The present disclosure relates generally to communication systems, and more particularly, to enhancements of the bandwidth part (BWP) switch or the small data transmission (SDT) in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to configure a pair of unrestricted bandwidth parts (BWPs) for communication with a network entity, where the pair of unrestricted BWPs includes an unrestricted uplink (UL) BWP and an unrestricted downlink (DL) BWP; and perform, based on at least one of the unrestricted UL BWP or the unrestricted DL BWP, a BWP operation for the communication with the network entity. The BWP operation includes one or more of a BWP switch or a small data transmission (SDT) with the network entity.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to configure a pair of unrestricted BWPs for communication with a UE, where the pair of unrestricted BWPs includes an unrestricted UL BWP and an unrestricted DL BWP; and perform, based on at least one of the unrestricted UL BWP or the unrestricted DL BWP, a BWP operation for the communication with the UE. The BWP operation includes one or more of a BWP switch or an SDT with the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
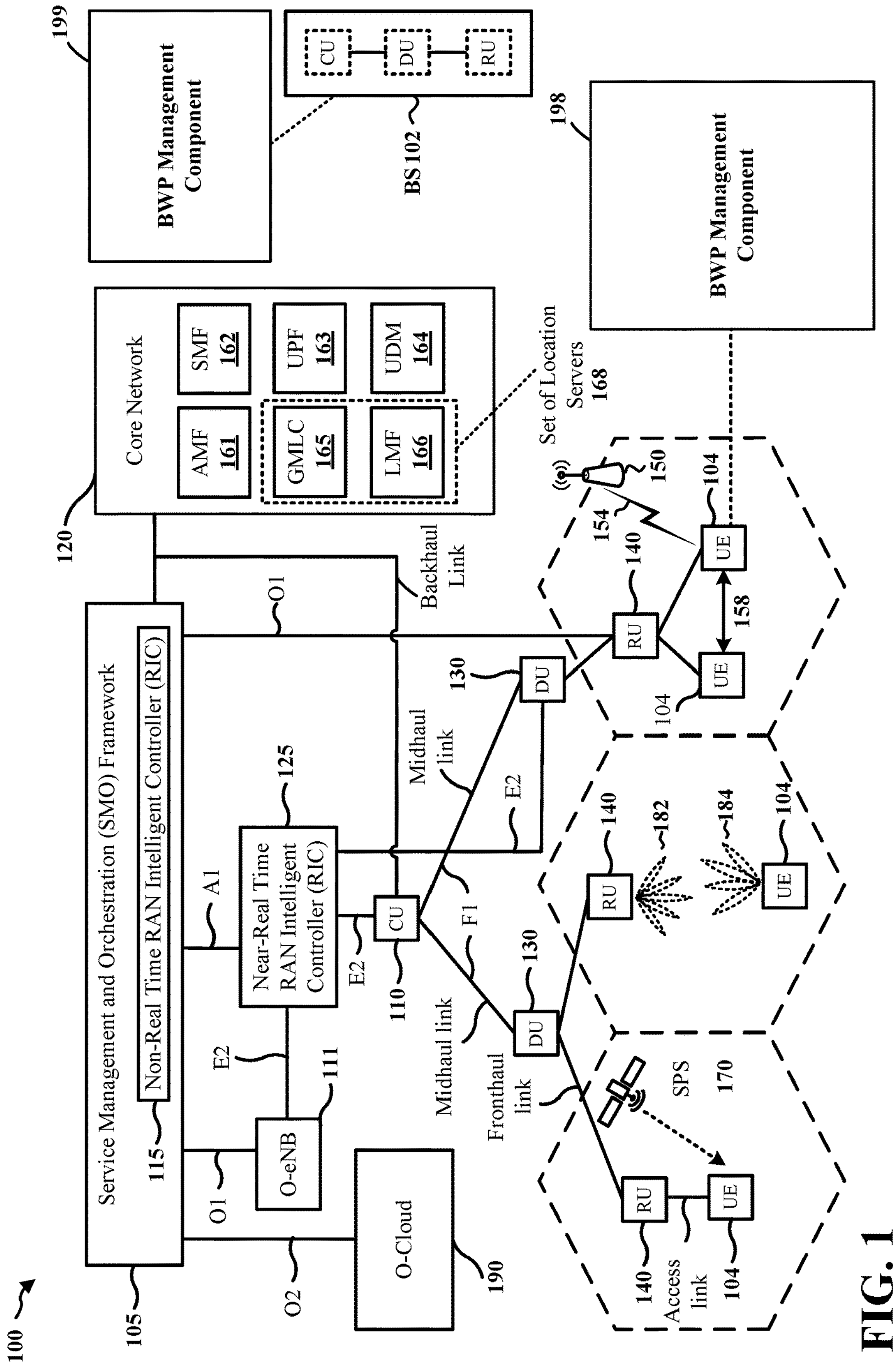
FIG. 1 is a diagram illustrating an example of a wireless communication system and an access network.

Small data transmission (SDT) allows data and signaling transmission while a user equipment (UE) remains in an inactive state (a state where a UE is connected to, but not actively communicating with, the network), which brings significant benefits in power savings and signaling overhead reduction to the UE and the network. However, the resource configurations for SDT are subject to the limitations inherent to the initial bandwidth part (BWP), which restricts the extension of SDT to small downlink (DL)/uplink (UL) traffic after radio resource control (RRC) connection in power saving models. Additionally, certain UEs, such as enhanced mobile broadband (eMBB) UEs with baseline capabilities, may not necessarily operate in an initial or non-initial DL BWP without control resource set (CORESET) zero (CORESET #0) and cell-defining synchronization signal block (CD-SSB). This leads to a congregation effect in BWP configurations that adversely affects the power consumption and the full utilization of frequency resources across the entire system bandwidth. Hence, a more adaptive approach in the BWP configuration that allows more efficient traffic offloading and power saving, particularly for small data transmissions, is desirable.

Various aspects relate generally to wireless communication. Some aspects more specifically relate to enhancements of the BWP switch or SDT in wireless communication. In some examples, a UE configures a pair of unrestricted BWPs for communication with a network entity. The pair of unrestricted BWPs includes an unrestricted UL BWP and an unrestricted DL BWP. The UE further performs, based on at least one of the unrestricted UL BWP or the unrestricted DL BWP, a BWP operation for the communication with the network entity. The BWP operation includes one or more of a BWP switch or an SDT with the network entity. In some examples, to perform the BWP operation, the UE may receive a BWP switch trigger for the BWP switch and perform the BWP switch from an active wideband BWP to a pair of default DL/UL BWPs including a default DL BWP and a default UL BWP. In some aspects, to perform the BWP operation, the UE may perform SDT with the network entity based on at least one of non-cell-defining (NCD)-synchronization signal block (NCD-SSB) or a tracking reference signal (TRS).

Particular aspects of the subject matter described in this disclosure can be implemented to realize one or more of the following potential advantages. In some examples, by including the configuration of a pair of unrestricted DL/UL BWPs, the described techniques may be used to allow for more flexibility in managing different UE types (e.g., eMBB, reduced capability (RedCap), enhanced reduced capability (eRedCap)) and traffic, thereby reducing congestion and improving energy efficiency. In some examples, by enabling the configuration of dedicated UL resources in the unrestricted UL BWP, the described techniques herein improve robustness and reduce latency in data/control communication, even when the UE is in power saving modes. Additionally, by providing a unified framework for power saving and traffic offloading from initial DL/UL BWPs in both connected and inactive states, the described techniques lead to better utilization of frequency resources.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a BWP management component 198. The BWP management component 198 may be configured to configure a pair of unrestricted BWPs for communication with a network entity, where the pair of unrestricted BWPs includes an unrestricted UL BWP and an unrestricted DL BWP; and perform, based on at least one of the unrestricted UL BWP or the unrestricted DL BWP, a BWP operation for the communication with the network entity. The BWP operation includes one or more of a BWP switch or an SDT with the network entity. In certain aspects, the base station 102 may include a BWP management component 199. The BWP management component 199 may be configured to configure a pair of unrestricted BWPs for communication with a UE, where the pair of unrestricted BWPs includes an unrestricted UL BWP and an unrestricted DL BWP; and perform, based on at least one of the unrestricted UL BWP or the unrestricted DL BWP, a BWP operation for the communication with the UE, where the BWP operation includes one or more of a BWP switch or an SDT with the UE. Although the following description may be focused on 5G NR, the concepts described herein may be applicable to other similar areas, such as LTE, LTE-A, CDMA, GSM, and other wireless technologies.

Figures 2A, 2B, 2C, 2D:
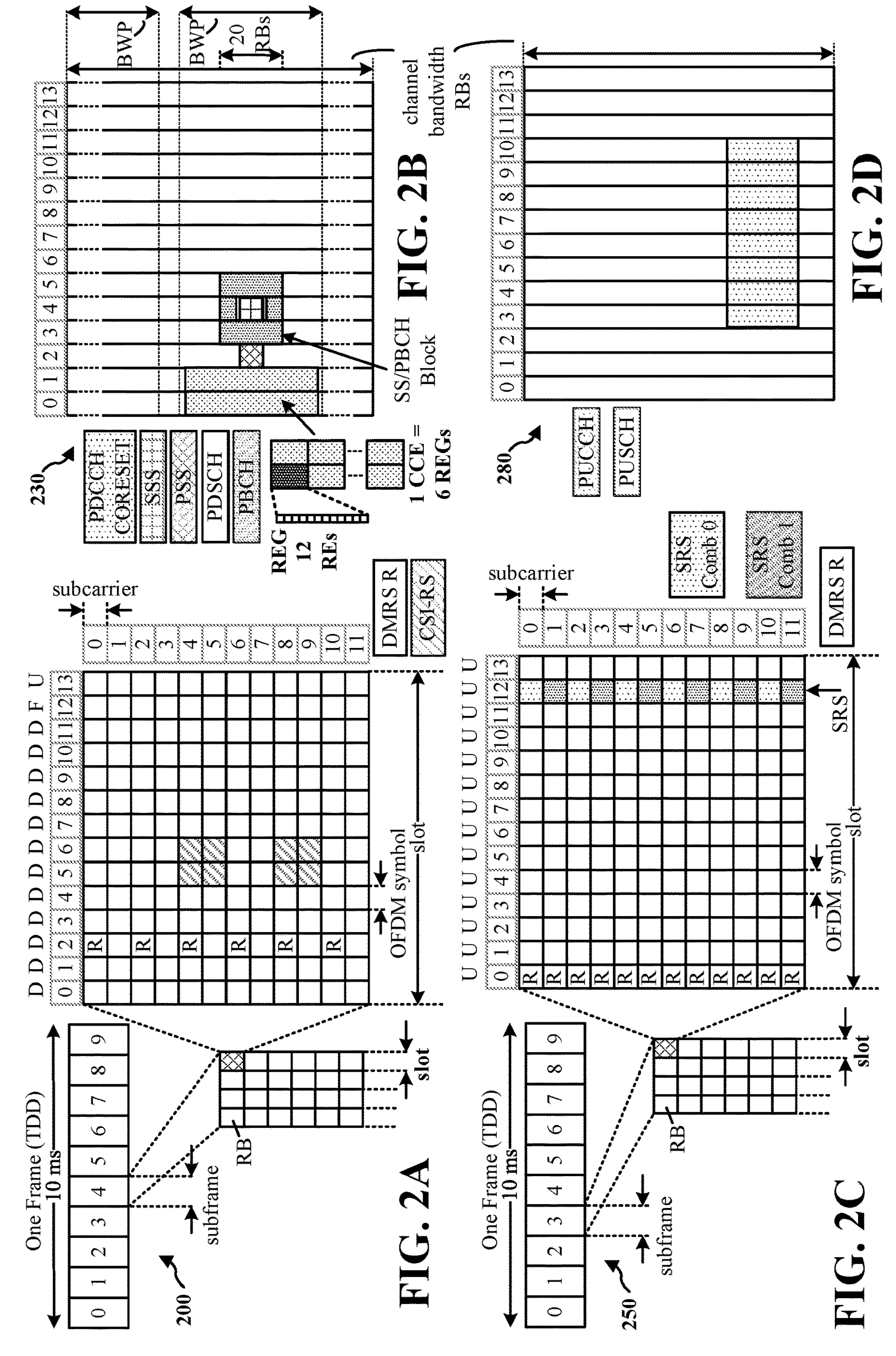
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
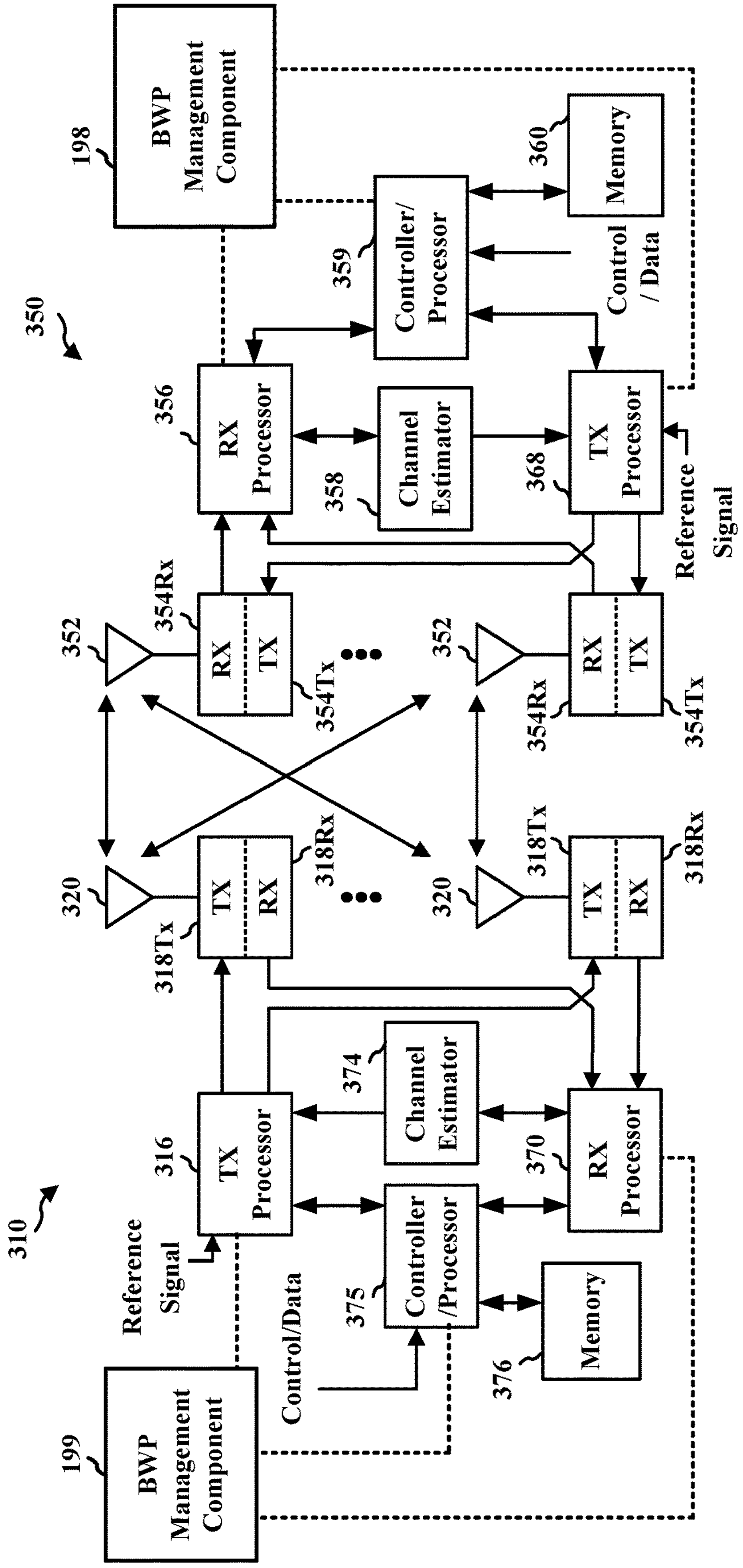
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the BWP management component 198 of FIG. 1.

At least one of the TX processor 316, the RX processor 370, and the controller/processor 375 may be configured to perform aspects in connection with the BWP management component 199 of FIG. 1.

In wireless communication, such as 5G NR, SDT takes place over the initial BWPs and for inactive UEs, and the initial BWPs include CORESET #0 and an SSB of the cell. However, for supporting multiple users, this condition may be too restrictive. To address this issue, example aspects presented herein propose to define unrestricted BWP that may not necessarily include CORESET #0 or SSB. In some examples, unrestricted DL BWP and unrestricted UL BWP may be defined, and SDT may be allowed over these BWPs.

Figure 4:
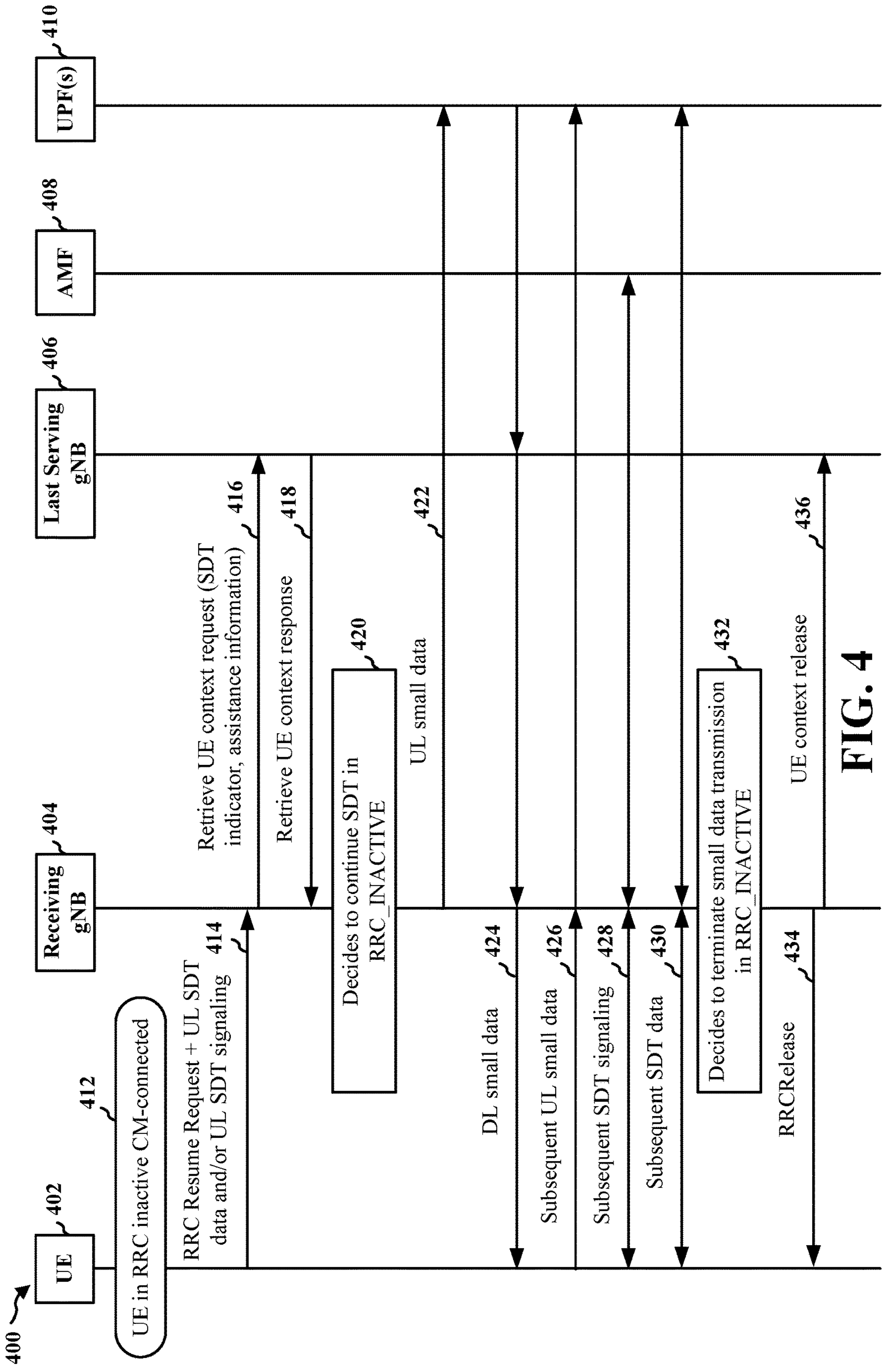
FIG. 4 is a diagram illustrating an example of random access (RA) based small data transmission (SDT).

In wireless communication, such as 5G NR, SDT enables data and/or signaling transmission while the UE remains in an inactive state (a state where the UE is connected to, but not actively communicating with, the network). The SDT may reduce power consumption and signaling overhead for both the UE and the network. In some examples, the network may enable SDT in various forms, such as mobile-originated SDT (MO-SDT), mobile-terminated SDT (MT-SDT), or a combination of both, within a cell for different types of UEs, such as enhanced mobile broadband (eMBB) UE, reduced capability (RedCap) UE, and enhanced reduced capability (eRedCap) UE. FIG. 4 is a diagram 400 illustrating an example of random access (RA) based SDT. In FIG. 4, a UE 402 may be in the RRC inactive state, as indicated by 412. The UE 402 may first transmit, at 414, a request (e.g., RRC Resume Request) and UL SDT data and/or UL SDT signaling to a receiving cell (e.g., a receiving gNB 404). The receiving cell (e.g., the receiving gNB 404), at 416, may transmit a retrieve UE context request to a serving cell (e.g., the last serving gNB 406). Upon receiving the retrieve UE context response at 418, the receiving cell (e.g., the receiving gNB 404) may, at 420, continue the SDT while the UE 902 remains in RRC inactive state. Then, the UL SDT (e.g., at 422, 426) and DL SDT (e.g., at 424) may commence between the UE 402 and the network (e.g., the receiving gNB 404, the last serving gNB 406, the access and mobility management function (AMF) 408, and the user plane function(s) (UPF(s) 410)). Additional SDT signaling (at 428) and SDT data (at 430) may occur between the UE 402 and the network until the SDT process is terminated at 432. After the completion of the SDT, the RRC and the UE context may be released, as shown at 434 and 436, respectively.

SDT may be initiated by either the UE or the network in the initial DL/UL BWP. The initial DL/UL BWP may be utilized for the initial access of UEs in an idle state or an inactive state. However, the resource configuration for SDT may be subject to the limitations inherent to the initial BWP. These limitations may constrain the application of SDT, particularly restricting its extension to small DL/UL traffic after an RRC connection in power saving mode. An example of this limitation is the fall back to the default BWP on a secondary primary cell (SpCell) or a secondary cell (SCell). For example, in NR or 5G, a DL BWP without restriction (e.g., a BWP that does not include control resource set (CORESET) zero (CORESET #0) and synchronization signal block (SSB) for the SCell) may be defined for an eMBB or RedCap UE. Upon the expiration of a BWP inactivity timer, the eMBB or RedCap UE may fall back to the default DL BWP. However, no UL BWP associated with the DL BWP without restriction or default DL BWP has been specified, which limits the application of SDT.

Figure 5:
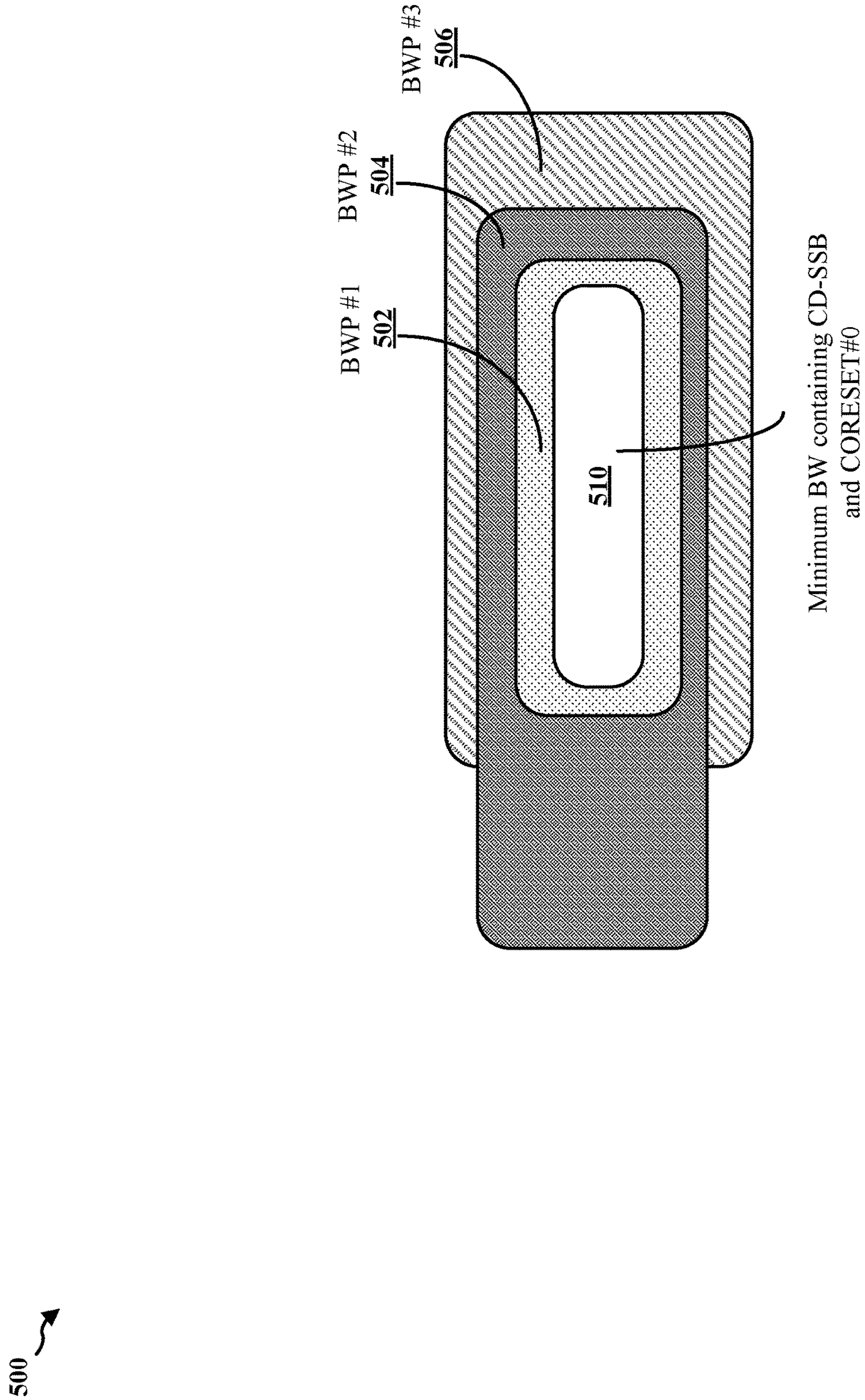
FIG. 5 is a diagram illustrating the congregation effect for bandwidth part (BWP) configurations.

In wireless communication, such as 5G or NR, an eMBB UE with baseline capabilities may not need to operate in an initial or non-initial DL BWP without control resource set (CORESET) zero (CORESET #0) and cell-defining synchronization signal block (CD-SSB). While this simplification of procedures for the UE is beneficial, it may lead to a congregation effect for BWP configurations when multiple BWPs include the bandwidth that contains CORESET #0 and CD-SSB. FIG. 5 is a diagram 500 illustrating an example of congregation effect for BWP configurations. In FIG. 5, multiple BWPs, such as BWP #1 502, BWP #2 504, and BWP #3 506 may all include the minimum bandwidth containing CD-SSB and CORESET #0 510, which may lead to congestion and degraded performance for those BWPs.

The congregation effect becomes increasingly prominent with the increase in system load and the introduction of different types of UEs, such as RedCap UEs and eRedCap UEs, particularly for a secondary primary cell (SpCell) or DL BWP with reduced bandwidth (BW). The congregation effect may not be desirable as it adversely affects the power savings for both UE and the network and the full utilization of frequency resources across the entire system bandwidth.

Additionally, the congregation effect may impact the flexibility of frequency domain resource allocation (FDRA) for PDSCH and PUSCH when the scheduling PDCCH uses a fallback DCI format (e.g., DCI format 1_0/0_0) and is transmitted in a BWP without CORESET #0. That is because the flexibility of FDRA is bounded by the size of CORESET #0, even though the bandwidth of the active DL/UL BWP may differ from that of CORESET #0. For example, in a DL resource allocation, the resource block assignment information may indicate to a scheduled UE a set of continuously allocated non-interleaved or interleaved virtual resource blocks within the active BWP size of $$N_{BWP}^{size}$$

physical resource blocks (PRBs). However, when DCI format 1_0 is decoded in any common search space, the BWP size may become the size of CORESET #0 if CORESET #0 is configured for the cell or the size of the initial DL BWP if CORESET #0 is not configured for the cell.

In scenarios when the CD-SSB and CORESET #0 are used, it is beneficial to configure a DL BWP without CD-SSB and CORESET #0 for different types of UEs, ranging from premium UEs to mid-tier and low-tier UEs. This approach addresses several issues. First, it mitigates the congregation effect encountered in wireless networks, such as 5G or NR wireless networks. Second, configuring the DL BWP without CD-SSB and CORESET #0 may lead to substantial energy savings for both the network and UEs, by reducing the necessity for the transmission or reception of always-on or periodic broadcast signals. Additionally, this new configuration may enable traffic offloading to different frequency segments of a cell with a wide bandwidth, a cell configured for multiple radio access technology (multi-RAT) sharing, or a virtual cell with a fragmented and distributed spectrum.

Example aspects presented herein provide the configurations for a pair of unrestricted DL/UL BWPs and the enhancements of associated BWP operations for communication between UEs and the network, such as BWP switches and small data transmissions (SDTs) associated with the unrestricted BWPs. The configurations for the pair of unrestricted DL/UL BWPs may provide a unified framework for power saving and traffic offloading from the initial DL/UL BWP for UEs in connected and inactive states.

In some aspects, the configuration of dedicated UL resources in the unrestricted UL BWP may overcome the limitations of current SDT mechanisms and the default DL BWP. Implementing the configurations for the pair of unrestricted DL/UL BWPs may improve the robustness and latency performance of data and control communication, especially in power saving modes. For example, the configurations may enable scheduling request (SR), buffer status report (BSR), and channel quality indicator (CQI) reporting using dedicated PUCCH or PUSCH resources, aperiodic and semi-persistent SRS transmission for channel sounding and timing control. Additionally, the configurations may allow for PDCCH ordered contention-free random access (CFRA) procedures to reacquire UL synchronization.

In some aspects, a UE may be jointly configured with a pair of unrestricted BWPs, which may include an unrestricted DL BWP and an unrestricted UL BWP. In some examples, the pair of unrestricted BWPs may be configured for SDT, and the configuration may be applicable for UEs that are in a connected state or an inactive state on a primary cell (PCell), or for UEs that are in a connected state on a secondary cell (SCell) or a primary secondary cell (e.g., a primary cell of the secondary cell groups, or PSCell).

In some aspects, an unrestricted UL BWP may be configured on a PCell, a PSCell, or a PUCCH SCell (a SCell that is used for transmitting the PUCCH). The unrestricted UL BWP may include various resources such as physical random access channel (PRACH) resources, PUCCH resources, SRS resources, and PUSCH resources. In some examples, the PRACH resources may be utilized for contention-based random access (CBRA) or CFRA, and PUCCH resources may be used for hybrid automatic repeat request (HARQ) feedback, scheduling request (SR), and compact CQI/channel state information (CSI) (CQI/CSI) reporting. Based on the pair of unrestricted DL/UL BWPs, the UE may initiate random access (RA) in the unrestricted BWP to reacquire UL synchronization and proactively inform the network about its status, such as the completion of BWP switch to default BWP. Additionally, the BWP fallback may be triggered by DCI or medium access control (MAC)-control element (MAC-CE), allowing the UE to perform CFRA based on PDCCH order and multiplex HARQ feedback with SR/buffer status report (BSR) to reduce the latency of UL synchronization and scheduling.

In some aspects, an unrestricted DL BWP may be configured on a PCell, a PSCell, or a SCell. The unrestricted DL BWP may include dedicated PDCCH resources (e.g., for UE-specific search space (USS) and common search space (CSS)) and PDSCH resources. The unrestricted DL BWP, however, may not include CD-SSB and CORESET #0. The unrestricted DL BWP may improve the energy efficiency for the network, as the UE operating on the unrestricted DL BWP may measure a DL reference signal (DL RS) outside the BWP for various tasks such as radio resource management (RRM), radio link monitoring (RLM), beam management (BM), time and frequency tracking, and the coarse and fine adjustment of automatic gain control (AGC).

Figure 6:
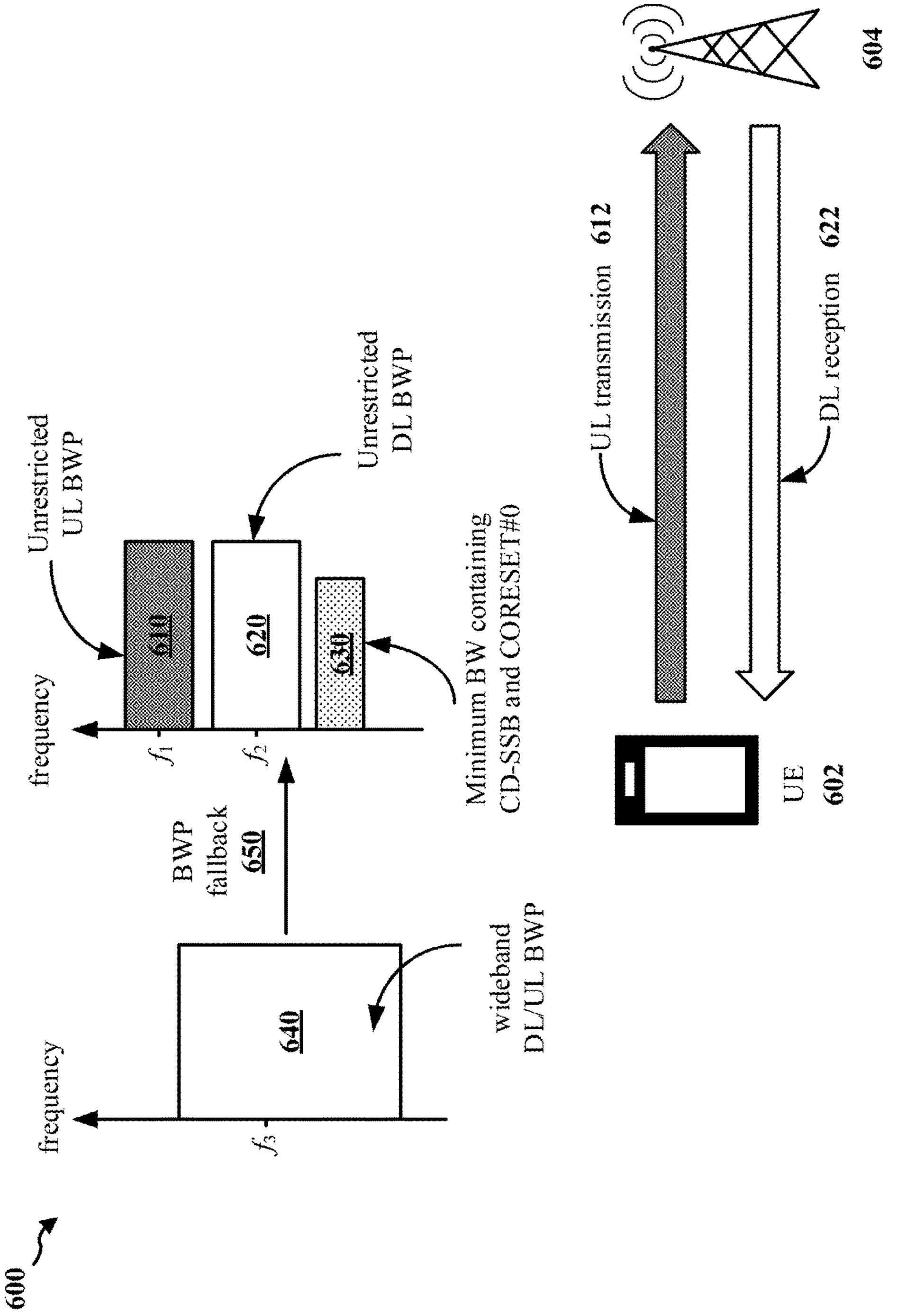
FIG. 6 is a diagram illustrating a pair of unrestricted BWPs in accordance with various aspects of the present disclosure.

FIG. 6 is a diagram 600 illustrating a pair of unrestricted BWPs in accordance with various aspects of the present disclosure. In FIG. 6, the UE 602 may be configured with a pair of unrestricted BWPs, including the unrestricted UL BWP 610 and the unrestricted DL BWP 620. The unrestricted UL BWP 610 may be used for UL transmission 612 to a network (e.g., base station 604), and the unrestricted DL BWP may be used for DL reception 622 from the network (e.g., base station 604). The unrestricted DL BWP may not include the CD-SSB and CORESET #0 630.

In some examples, the unrestricted UL BWP and the unrestricted DL BWP may not necessarily be aligned at the center frequency. For example, as shown in FIG. 6, the center frequency $f_2$ of the unrestricted DL BWP 620 (e.g., the first center frequency) and the center frequency $f_1$ of the unrestricted UL BWP 610 (e.g., the second center frequency) may have a frequency gap that is greater than zero. This flexibility may be maintained regardless of whether the unrestricted DL BWP (e.g., 620) and the unrestricted UL BWP (e.g., 610) are configured on time division duplex (TDD) bands, frequency division duplex (FDD) bands, or a hybrid of frequency bands with different duplex modes. Additionally, based on UE capability, DL-to-UL and UL-to-DL retuning gaps may be configured to facilitate direction switching on the unrestricted DL/UL BWPs. For example, a UE (e.g., UE 602) may receive one or more of a DL-to-UL retuning gap and an UL-to-DL retuning gap. The DL-to-UL retuning gap may be applicable for switching from the DL reception 622 based on the unrestricted DL BWP 620 to the UL transmission 612 based on the unrestricted UL BWP 610, and the UL-to-DL retuning gap may be applicable for switching from the UL transmission 612 based on the unrestricted UL BWP 610 to the DL reception 622 based on the unrestricted DL BWP 620.

In some aspects, the pair of unrestricted BWPs (e.g., 610 and 620) may be used for various BWP operations. The BWP operations may include a BWP switch, which may include the BWP fallback 650 from an active, wideband DL/UL BWP (e.g., wideband DL/UL BWP 640) to the unrestricted DL/UL BWP (e.g., unrestricted UL BWP 610 and unrestricted DL BWP 620). The BWP switch may be triggered via various signaling mechanisms, such as DCI, a MAC-CE, radio resource control (RRC) re-configuration. In some examples, the BWP switch may also be triggered by a BWP-inactivity timer (e.g., by the expiration of the BWP-inactivity timer). In some examples, cross-BWP scheduling from an active DL BWP (e.g., wideband DL/UL BWP 640) to the unrestricted DL/UL BWP (e.g., unrestricted UL BWP 610 and unrestricted DL BWP 620) may be supported. The cross-BWP scheduling may include, for example, dynamic scheduling for PDSCH and PUSCH, activation of SPS, or a configured grant associated with the default DL/UL BWP. The scheduling or activation may be based on DCI or a MAC-CE.

In some aspects, when operating on a PCell, a PSCell, or a physical uplink control channel secondary cell (PUCCH SCell) in a connected state, a UE (e.g., a 6G UE) may be configured with a pair of unrestricted DL/UL BWPs (e.g., unrestricted UL BWP 610 and unrestricted DL BWP 620) as the default BWP. This approach differs from the timer-based BWP switch, as the default BWP is configured for both DL and UL. When there is a fallback from a wideband BWP (e.g., wideband DL/UL BWP 640) to the default unrestricted BWP, the fallback occurs on both DL and UL.

Figure 7:
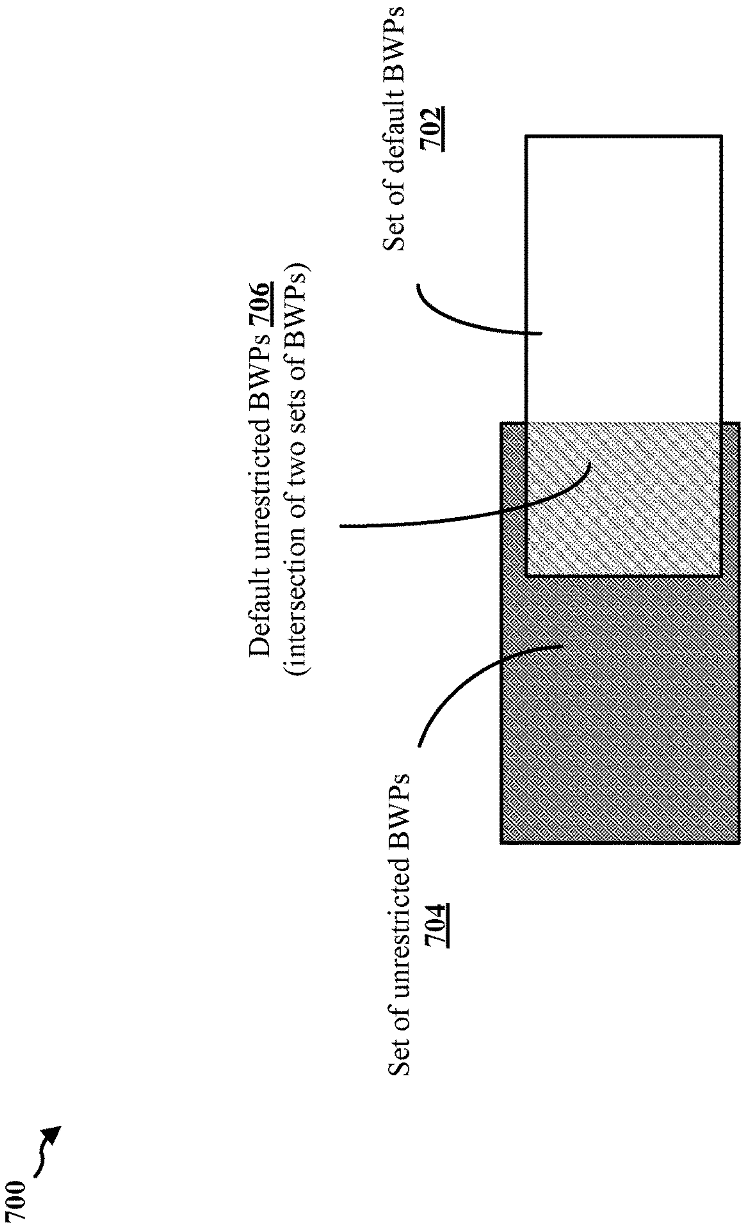
FIG. 7 is a diagram illustrating an example of the intersection of the default BWPs and the unrestricted BWPs in accordance with various aspects of the present disclosure.

In some aspects, the default DL/UL BWPs may be configured as the unrestricted DL/UL BWPs (e.g., unrestricted UL BWP 610 and unrestricted DL BWP 620). In some aspects, the default DL/UL BWPs may at least partially overlap (e.g., intersect) with the pair of the unrestricted BWPs, and the overlapping area (or the intersection area) of the default DL/UL BWPs and the unrestricted BWPs may be referred to as the default unrestricted BWP. FIG. 7 is a diagram 700 illustrating an example of the intersection of the default BWPs and the unrestricted BWPs in accordance with various aspects of the present disclosure. In FIG. 7, the default DL/UL BWPs 702 may at least partially overlap the unrestricted BWPs 704, and the intersection of the default DL/UL BWPs 702 and the unrestricted BWPs 704 may be referred to as the default unrestricted BWPs 706. In some examples, when a BWP switch (e.g., a BWP fallback) occurs, the BWP may switch (e.g., fallback) from a wideband BWP (e.g., wideband DL/UL BWP 640) to the default unrestricted BWPs 706.

In situations where the timing alignment timer (TA timer or TAT), which may be an UL timing alignment timer, is not running (e.g., the TA timer has expired or stopped) after the UE falls back to the default DL/UL BWP or the default unrestricted DL/UL BWP, the UE may reacquire its UL synchronization with the network (e.g., the base station). To do this, the UE may initiate a random access (RA) procedure to reacquire UL synchronization. After the UE reacquired the UL synchronization, the UE may indicate its status (e.g., the completion of the BWP switch to the default DL/UL BWP or the default unrestricted DL/UL BWP) to the network. This may be done by, for example, transmitting its UE identifier (ID), such as the cell radio network temporary identifier (C-RNTI), to the network in msg3/msgA associated with the RA procedure. On the other hand, if the TA timer is running after the UE falls back to the default DL/UL BWP or the default unrestricted DL/UL BWP, it indicates the UE's UL transmission is synchronized with the network (e.g., the base station). In this scenario, the UE may indicate its status to the network either by transmitting its UE ID using the configured grant-physical uplink shared channel (CG-PUSCH) resource configured in the default unrestricted UL BWP or, if the CG-PUSCH resource is not configured, by initiating an RA procedure and transmitting its UE ID in msg3/msgA associated with the RA procedure. Upon receiving the UE status indication in the default unrestricted UL BWP, the network may cancel the HARQ processes, SPS, or CG resources configured in the wideband DL/UL BWP.

In some aspects, the BWP operation may include SDT via the pair of unrestricted DL/UL BWPs. For example, both UE-initiated and network-initiated SDT may be supported on the pair of unrestricted DL/UL BWP for a PSCell or a SCell in a connected state, and a PCell in both connected and inactive states.

In some examples, at least one of non-cell defining synchronization signal block (NCD-SSB) or tracking reference signal (TRS) may be configured for SDT in connected or inactive states. In some examples, to ensure the continuity of services, such as voice services or multimedia broadcast services (MBS), on a PCell, a UE may reuse the unrestricted BWP configured for SDT to facilitate the state transition between connected and inactive states. For example, if the TA timer is still running and the last TA before the state transition between the connected and inactive states is validated (e.g., based on the reference signal received power (RSRP) measurements for a DL path loss reference signal (RS) within or outside the unrestricted DL BWP), the state transition may be RACH-less (e.g., does not involve a RACH procedure). As used herein, "validating a TA" (or TA validation) may refer to a UE procedure of validating the latest/last timing advance command (e.g., $N_{TA\_last}$) for UL transmission. The timing advance command may be determined by the network (e.g., a base station) and transmitted in a MAC-CE (the MAC-CE for timing advance command may be mapped to PDSCH). Upon receiving the timing advance command, the UE may reset the timing alignment timer (TAT) for UL transmission. If the TAT is running, but the UE does not receive an updated timing advance command, the UE may initiate the TA validation procedure. If the TA validation is successful, the UE may reuse the latest/last timing advance command for UL transmission.

Figure 8:
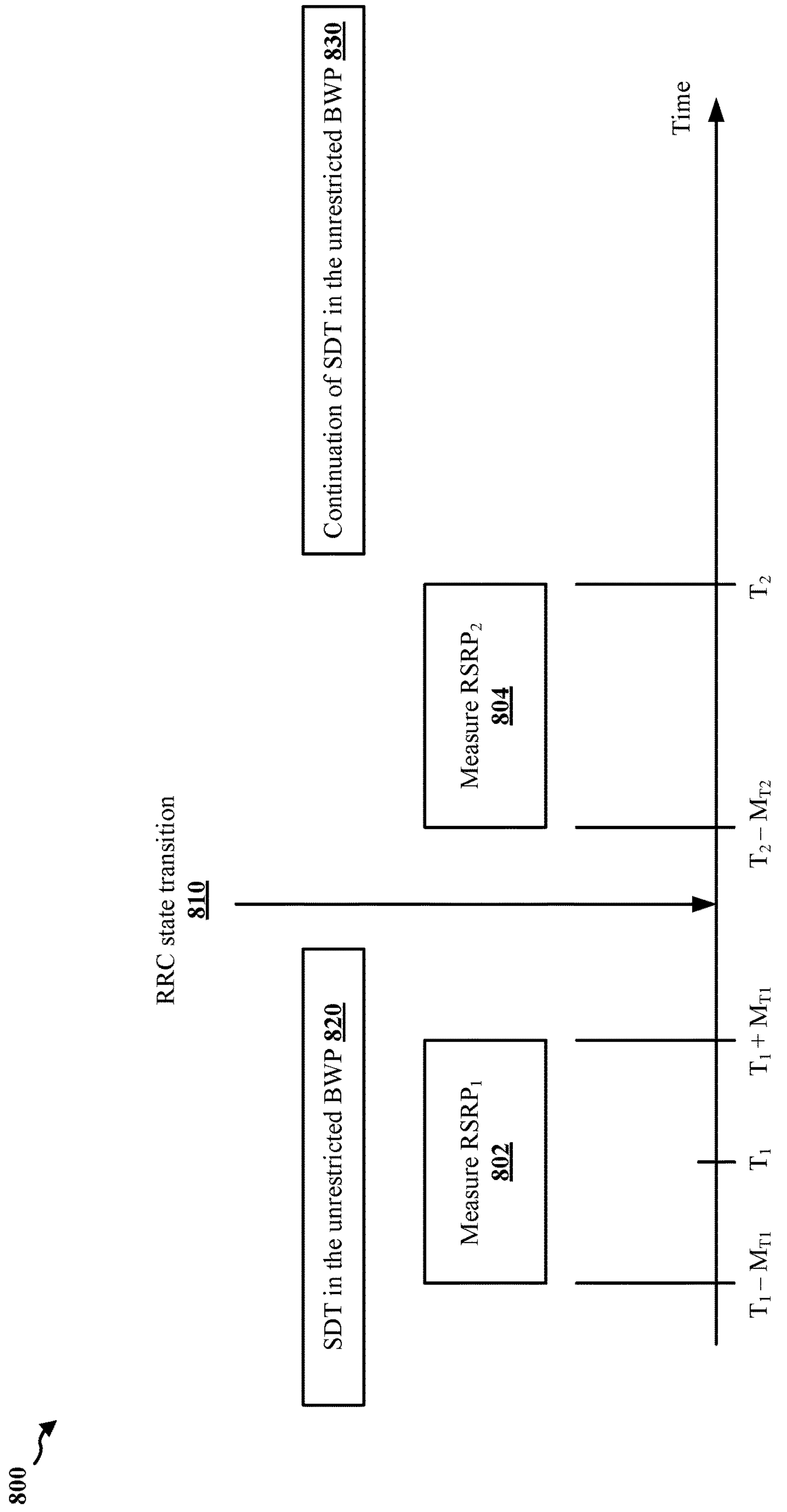
FIG. 8 is a diagram illustrating an example of the timing alignment timer (TA timer) validation based on the reference signal received power (RSRP) measurements in accordance with various aspects of the present disclosure.

FIG. 8 is a diagram 800 illustrating an example of the TA validation based on the RSRP measurements in accordance with various aspects of the present disclosure. As shown in FIG. 8, while a UE performs SDT with a network in the unrestricted BWP at 820, the UE may perform a first measurement $RSRP_1$ of the RSRP on an RS at 802. The first measurement $RSRP_1$ may be conducted by the UE within a designated time window of $[T_1-M_{T1}, T_1+M_{T1}]$, where $T_1$ represents the time when the UE receives the latest/last timing advance command ($N_{TA\_last}$) from the network (e.g., in a TA command MAC-CE), and $M_{T1}$ is calculated based on the measurement cycle of the PCell, the frequency range, and a scaling factor that is configured by the network. After the RRC state transition 810, the UE may perform a second measurement $RSRP_2$ of the RSRP at 804. The second measurement $RSRP_2$ may be conducted by the UE within a time window of $[T_2-M_{T2}, T_2]$, where $T_2$ is the time when the UE performs the TA validation, and, similar to $M_{T1}$, $M_{T2}$ is determined by the measurement cycle of PCell, the frequency range, and a scaling factor that is configured by the network. The last TA before the state transition (e.g., RRC state transition 810) may be validated based on the two RSRP measurements (e.g., $RSRP_1$ and $RSRP_2$). For example, the last TA before the state transition (e.g., RRC state transition 810) may be considered valid if the absolute difference between $RSRP_1$ and $RSRP_2$ is less than or equal to a threshold (e.g., RSRPChangeThreshold), which may be configured by the network. That is, if $|RSRP_1-RSRP_2| \le RSRPChangeThreshold$, the last TA before the RRC state transition may be considered valid.

Following a successful TA validation, the UE may continue the SDT in the unrestricted BWP at 830. For example, the UE may either resume MO-SDT using configured grant-physical uplink shared channel (CG-PUSCH), or the UE may transmit PUCCH or SRS in the unrestricted UL BWP without initiating an RA procedure.

Figure 9:
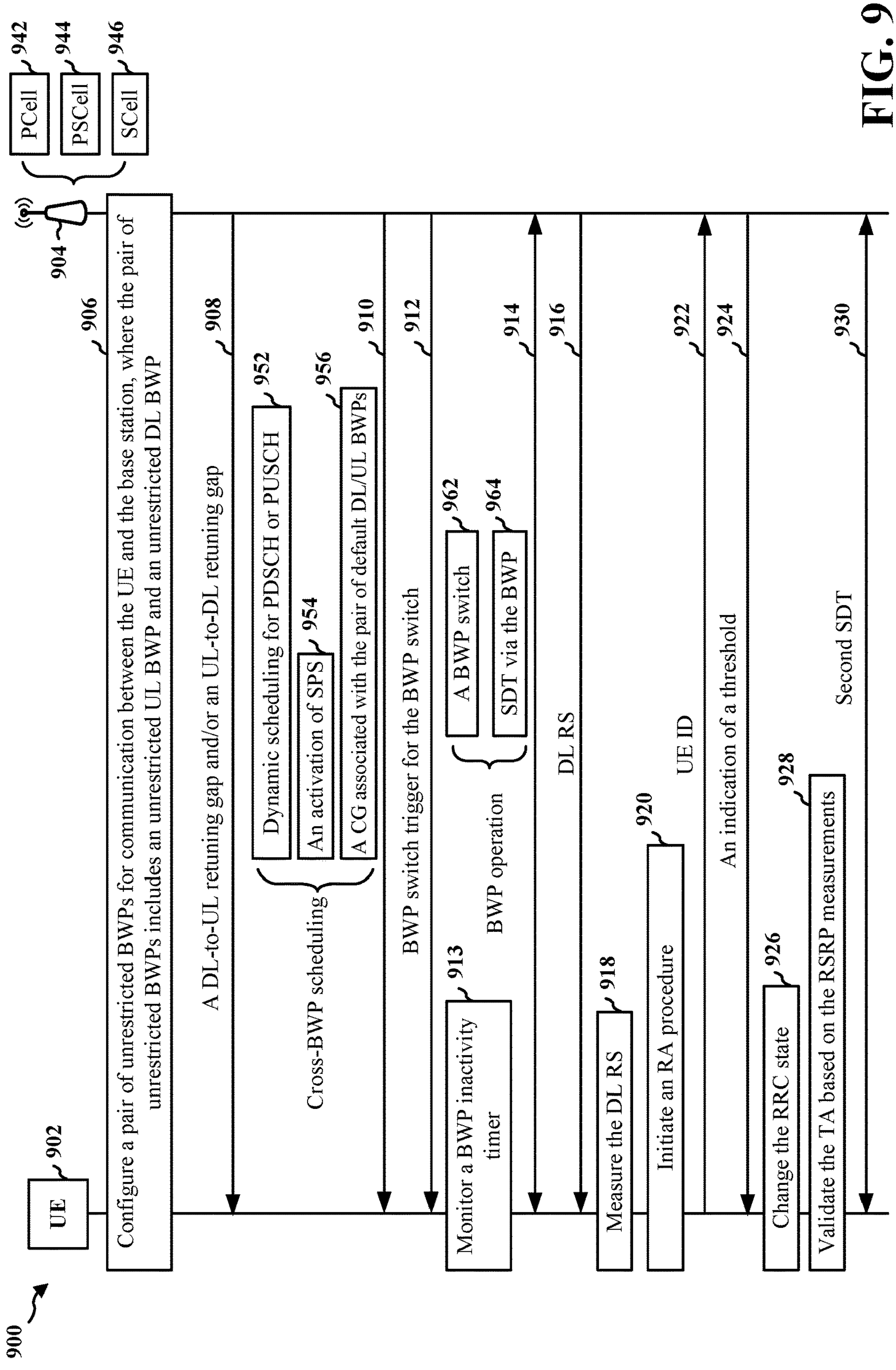
FIG. 9 is a call flow diagram illustrating a method of wireless communication in accordance with various aspects of the present disclosure.

FIG. 9 is a call flow diagram 900 illustrating a method of wireless communication in accordance with various aspects of this present disclosure. Various aspects are described in connection with a UE 902 and a base station 904. The aspects may be performed by the UE 902 or the base station 904 in aggregation and/or by one or more components of a base station 904 (e.g., a CU 110, a DU 130, and/or an RU 140).

As shown in FIG. 9, a UE 902 may, at 906, configure a pair of unrestricted BWPs for communication between the UE 902 and the base station 904. The pair of unrestricted BWPs may include an unrestricted UL BWP (e.g., 610) and an unrestricted DL BWP (e.g., 620). The base station 904 may include a PCell 942 of the UE 902, a PSCell 944 of the UE 902, or a SCell 946 of the UE 902. In some examples, when the base station 904 includes the PCell 942, the UE 902 may be in a connected state or an inactive state. When the base station 904 includes the PSCell 944 or the SCell 946, the UE 902 may be in the connected state.

In some aspects, at 908, the UE 902 may receive a DL-to-UL retuning gap, or an UL-to-DL retuning gap, or both for direction switching on the unrestricted DL/UL BWPs. For example, the DL-to-UL retuning gap may indicate a gap for switching from a DL reception (e.g., 622) based on the DL BWP (e.g., the unrestricted DL BWP 620) to an UL transmission (e.g., 612) based on the UL BWP (e.g., the unrestricted UL BWP 610), and the UL-to-DL retuning gap may indicate a gap for switching from the UL transmission (e.g., 612) based on the UL BWP (e.g., the unrestricted UL BWP 610) to the DL reception (e.g., 622) based on the DL BWP (e.g., the unrestricted DL BWP 620).

In some aspects, at 910, the UE 902 may receive, from the base station 904, cross-BWP scheduling from the active DL BWP to the unrestricted DL/UL BWPs. The cross-BWP scheduling may include, for example, dynamic scheduling for PDSCH or PUSCH 952, an activation of SPS 954, or a configured grant associated with the pair of default DL/UL BWPs 956. In some examples, the UE 902 may receive the cross-BWP scheduling via DCI, or a MAC-CE.

In some examples, at 912, the UE 902 may receive, from the base station 904, a BWP switch trigger for the BWP switch. For example, the BWP switch may be a BWP fallback 650 from a wideband DL/UL BWP 640 to the pair of unrestricted BWPs (e.g., 610 and 620). In some examples, the UE 902 may receive the BWP switch trigger via DCI, a MAC-CE, or an RRC reconfiguration.

In some examples, the BWP switch may be triggered by a BWP inactivity timer. For example, the UE 902 may, at 913, monitor the BWP inactivity timer. If the BWP inactivity timer expires, the BWP switch may be triggered.

At 914, based on at least one of the unrestricted UL BWP or the unrestricted DL BWP (configured at 906), the UE 902 and the base station 904 may perform a BWP operation for the communication between the UE 902 and the base station 904. For example, the BWP operation may include one or more of a BWP switch 962 or an SDT 964. In some examples, the BWP switch 962 may include a BWP fallback 650 from a wideband BWP (e.g., 640) to the default DL/UL BWP or default unrestricted DL/UL BWPs (including a default unrestricted DL BWP and a default unrestricted UL BWP). The default unrestricted DL/UL BWPs (e.g., 706) are the intersection of the default BWPs (e.g., 702) and the unrestricted BWPs (e.g., 704). For example, the default unrestricted DL BWP is the intersection of the default DL BWP with the unrestricted DL BWP, and the default unrestricted UL BWP is the intersection of the default UL BWP with the unrestricted UL BWP. The SDT (at 964) may be initiated by the UE 902 or by the base station 904 on the pair of unrestricted DL/UL BWPs. If the base station 904 includes the PCell 942 of the UE 902, the UE 902 may be in the connected or inactive state. If the base station 904 includes the PSCell 944 or the SCell 946 of the UE 902, the UE 902 may be in the connected state.

In some examples, the UE 902 may measure a DL reference signal (RS) for purposes such as RRM, RLM, BM, time or frequency tracking, and coarse or fine adjustment of AGC. The measurement may be gapless (meaning the measurement of the DL RS is continuous, without any interruptions or gaps in the measurement process) or gap-assisted (meaning there exist periodic interruptions or gaps in the measurement process). The UE 902 may receive the DL RS via a resource outside of the pair of unrestricted BWPs (e.g., the unrestricted DL BWP). For example, at 916, the UE 902 may receive a DL RS, and, at 918, measure the DL RS.

In some examples, after the BWP switch (e.g., BWP fallback 650) at 914, the UE 902 may indicate its status (e.g., the completion of the BWP switch) to the base station 904. Depending on whether a TA timer is running after the BWP switch, the UE 902 may indicate its status in various ways. In some examples, the TA timer may not be running after the BWP switch (e.g., BWP fallback 650) at 914. In these scenarios, the UE 902 may, at 920, initiate an RA procedure to reacquire the UL synchronization. Then, the UE 902 may indicate its status (e.g., the completion of the BWP switch) to the base station 904. For example, the UE 902 may indicate its status by transmitting, at 922, its UE identifier (ID), such as the C-RNTI, to the base station 904 in msg3/msgA associated with the RA procedure. In some examples, the TA timer may still be running after the BWP switch (e.g., BWP fallback 650) at 914. In these scenarios, the UE 902 may indicate its status (e.g., the completion of the BWP switch) to the base station 904 by transmitting, at 922, its UE ID (e.g., its C-RNTI) using CG-PUSCH resources configured in the default unrestricted UL BWP. Alternatively, if the CG-PUSCH resource is not configured, the UE 902 may initiate, at 920, an RA procedure, and, at 922, transmit its UE ID (e.g., its C-RNTI) in msg3/msgA associated with the RA procedure.

In some aspects, at 924, the UE 902 may receive an indication of a threshold from the base station 904. The threshold may be used to determine whether the UE 902 may reuse the unrestricted BWP configured for SDT when switching between RRC states (e.g., between connected and inactive states).

At 926, the UE 902 may change its RRC state. For example, the UE 902 may change from the RRC connected state to the RRC inactive state, or change from the RRC inactive state to the RRC connected state.

At 928, the UE 902 may validate a timing alignment (TA) based on the difference between a first reference signal received power (RSRP) measured before the change of the RRC state (at 926) and a second RSRP measured after the change of the RRC state (at 926). The difference of the RSRP measurements may be compared with the threshold received at 924.

In some examples, if the difference of the RSRP measurements is less than or equal to the threshold received at 924, the TA may be considered validated, and the UE 902 may perform a second SDT at 930, and the second SDT may reuse the unrestricted BWP configured for SDT (at 964) without initiating an RA procedure.

Figure 10:
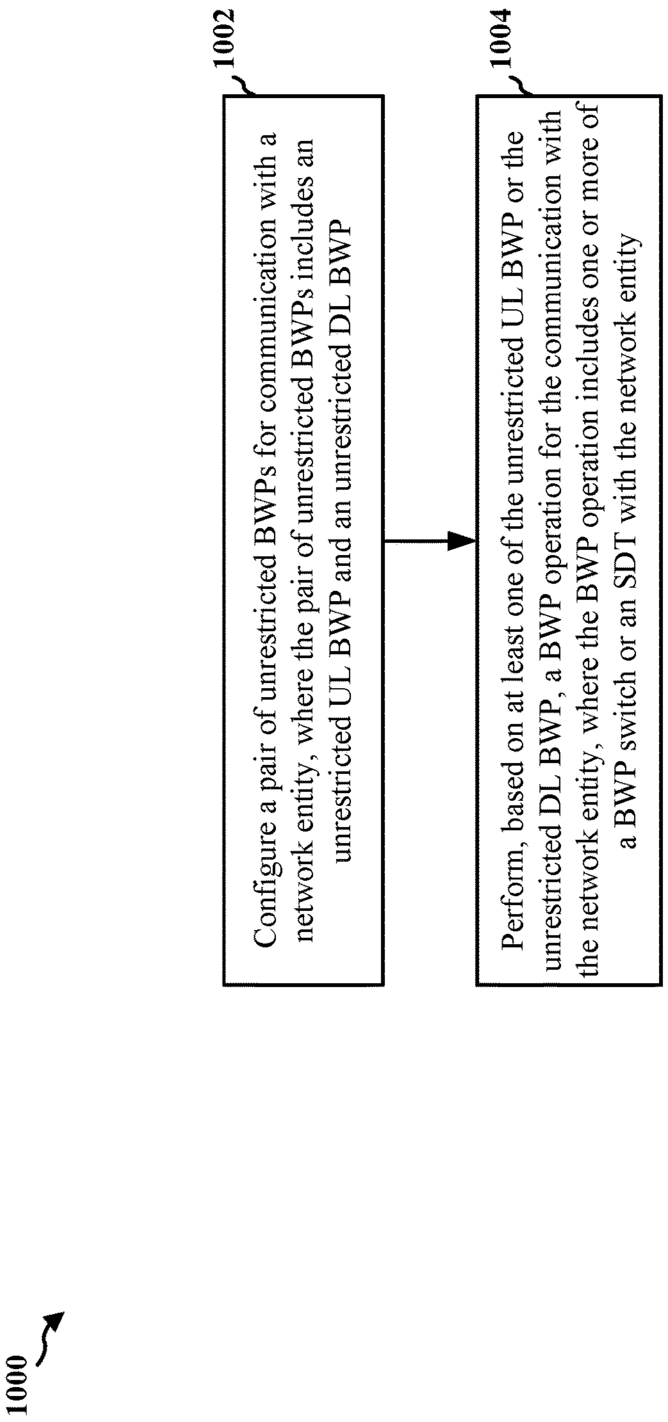
FIG. 10 is a flowchart illustrating methods of wireless communication at a UE in accordance with various aspects of the present disclosure.

FIG. 10 is a flowchart 1000 illustrating methods of wireless communication at a UE in accordance with various aspects of the present disclosure. The method may be performed by a UE. The UE may be the UE 104, 350, 602, 902, or the apparatus 1404 in the hardware implementation of FIG. 14. The methods provide a configuration for a pair of unrestricted DL/UL BWPs, allowing for more flexibility in managing different UE types (e.g., eMBB, RedCap, eRedCap) and traffic, thereby reducing congestion and improving energy efficiency. The configuration of dedicated UL resources in the unrestricted UL BWP improves robustness and reduces latency in data/control communication, even when the UE is in power saving modes. Additionally, the methods provide a unified framework for power saving and traffic offloading from initial DL/UL BWPs in both connected and inactive states, leading to better utilization of frequency resources.

As shown in FIG. 10, at 1002, the UE may configure a pair of unrestricted BWPs for communication with a network entity. The pair of unrestricted BWPs may include an unrestricted UL BWP and an unrestricted DL BWP. The network entity may be a base station, or a component of a base station, in the access network of FIG. 1 or a core network component (e.g., base station 102, 310, 604, 904; or the network entity 1402 in the hardware implementation of FIG. 14). FIGS. 6, 7, 8, and 9 illustrate various aspects of the steps in connection with flowchart 1000. For example, referring to FIG. 6 and FIG. 9, the UE 902 may, at 906, configure a pair of unrestricted BWPs for communication with a network entity (base station 904). The pair of unrestricted BWPs may include an unrestricted UL BWP 610 and an unrestricted DL BWP 620. In some aspects, 1002 may be performed by the BWP management component 198.

At 1004, the UE may perform, based on at least one of the unrestricted UL BWP or the unrestricted DL BWP, a BWP operation for the communication with the network entity. The BWP operation may include, for example, a BWP switch or an SDT with the network entity. For example, referring to FIG. 9, the UE 902 may perform, at 914, based on at least one of the unrestricted UL BWP (e.g., 610) or the unrestricted DL BWP (e.g., 620), a BWP operation for the communication with the network entity (base station 904). The BWP operation may include, for example, a BWP switch 962 or an SDT 964 with the network entity (base station 904). In some aspects, 1004 may be performed by the BWP management component 198.

Figure 11:
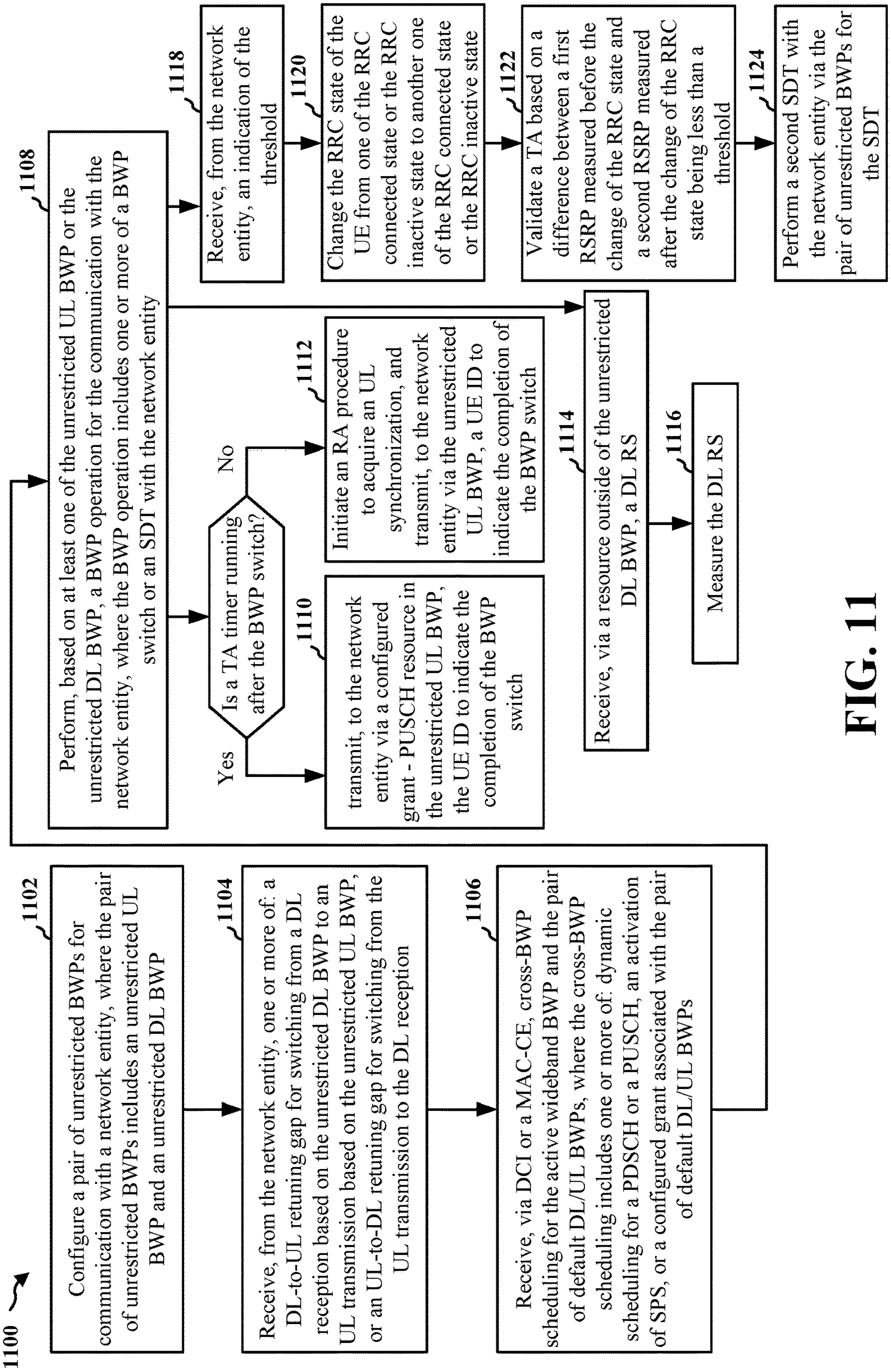
FIG. 11 is a flowchart illustrating methods of wireless communication at a UE in accordance with various aspects of the present disclosure.

FIG. 11 is a flowchart 1100 illustrating methods of wireless communication at a UE in accordance with various aspects of the present disclosure. The method may be performed by a UE. The UE may be the UE 104, 350, 602, 902, or the apparatus 1404 in the hardware implementation of FIG. 14. The methods provide a configuration for a pair of unrestricted DL/UL BWPs, allowing for more flexibility in managing different UE types (e.g., eMBB, RedCap, eRedCap) and traffic, thereby reducing congestion and improving energy efficiency. The configuration of dedicated UL resources in the unrestricted UL BWP improves robustness and reduces latency in data/control communication, even when the UE is in power saving modes. Additionally, the methods provide a unified framework for power saving and traffic offloading from initial DL/UL BWPs in both connected and inactive states, leading to better utilization of frequency resources.

As shown in FIG. 11, at 1102, the UE may configure a pair of unrestricted BWPs for communication with a network entity. The pair of unrestricted BWPs may include an unrestricted UL BWP and an unrestricted DL BWP. The network entity may be a base station, or a component of a base station, in the access network of FIG. 1 or a core network component (e.g., base station 102, 310, 604, 904; or the network entity 1402 in the hardware implementation of FIG. 14). FIGS. 6, 7, 8, and 9 illustrate various aspects of the steps in connection with flowchart 1100. For example, referring to FIG. 6 and FIG. 9, the UE 902 may, at 906, configure a pair of unrestricted BWPs for communication with a network entity (base station 904). The pair of unrestricted BWPs may include an unrestricted UL BWP 610 and an unrestricted DL BWP 620. In some aspects, 1102 may be performed by the BWP management component 198.

At 1108, the UE may perform, based on at least one of the unrestricted UL BWP or the unrestricted DL BWP, a BWP operation for the communication with the network entity. The BWP operation may include, for example, a BWP switch or an SDT with the network entity. For example, referring to FIG. 9, the UE 902 may perform, at 914, based on at least one of the unrestricted UL BWP (e.g., 610) or the unrestricted DL BWP (e.g., 620), a BWP operation for the communication with the network entity (base station 904). The BWP operation may include, for example, a BWP switch 962 or an SDT 964 with the network entity (base station 904). In some aspects, 1108 may be performed by the BWP management component 198.

In some aspects, the network entity may be one of a PCell of the UE, a PSCell of the UE, or a SCell of the UE. The RRC state of the UE may be the RRC connected state or the RRC inactive state if the network entity is the PCell, and the RRC state of the UE may be the RRC connected state if the network entity is the PSCell or the SCell. For example, referring to FIG. 9, the network entity (base station 904) may be one of a PCell 942 of the UE 902, a PSCell 944 of the UE 902, or a SCell 946 of the UE 902. The RRC state of the UE 902 may be the RRC connected state or the RRC inactive state if the network entity (base station 904) is the PCell 942, and the RRC state of the UE 902 may be the RRC connected state if the network entity (base station 904) is the PSCell 944 or the SCell 946.

In some aspects, the network entity may be one of the PCell, the PSCell, or a PUCCH SCell of the UE, and the unrestricted UL BWP may include one or more of: a PRACH resource, a PUCCH resource, an SRS resource, or a PUSCH resource. For example, referring to FIG. 6 and FIG. 9, the network entity (base station 904) may be one of the PCell 942, the PSCell 944, or a PUCCH SCell of the UE 902, and the unrestricted UL BWP 610 may include one or more of: a PRACH resource, a PUCCH resource, an SRS resource, or a PUSCH resource.

In some aspects, the unrestricted DL BWP may include dedicated PDCCH and PDSCH resources, and the unrestricted DL BWP may not include CORESET #0 and CD-SSB. For example, referring to FIG. 6, the unrestricted DL BWP 620 may include dedicated PDCCH and PDSCH resources, and the unrestricted DL BWP 620 may not include CORESET #0 and CD-SSB (e.g., 630).

In some aspects, at 1114, the UE may receive, via a resource outside of the unrestricted DL BWP, a DL RS. At 1116, the UE may measure the DL RS. For example, referring to FIG. 9, the UE 902 may receive, at 916, via a resource outside of the unrestricted DL BWP (e.g., 620), a DL RS. At 918, the UE 902 may measure the DL RS. In some aspects, 1114 and 1116 may be performed by the BWP management component 198.

In some aspects, the unrestricted UL BWP and the unrestricted DL BWP do not need to be aligned at the center frequency, regardless they are configured on TDD band, FDD band, or a hybrid of frequency bands with different duplex modes. For example, a first center frequency of the unrestricted DL BWP and a second center frequency of the unrestricted UL BWP may have a frequency gap greater than zero. For example, referring to FIG. 6, the center frequency $f_2$ of the unrestricted DL BWP 620 and the center frequency $f_1$ of the unrestricted UL BWP 610 may have a frequency gap greater than zero.

In some aspects, at 1104, the UE may receive, from the network entity, one or more of: a DL-to-UL retuning gap for switching from a DL reception based on the unrestricted DL BWP to an UL transmission based on the unrestricted UL BWP, or an UL-to-DL retuning gap for switching from the UL transmission to the DL reception. For example, referring to FIG. 6 and FIG. 9, the UE 902 may receive, at 908, from the network entity (base station 904), one or more of: a DL-to-UL retuning gap for switching from a DL reception 622 based on the unrestricted DL BWP 620 to an UL transmission 612 based on the unrestricted UL BWP 610, or an UL-to-DL retuning gap for switching from the UL transmission 612 to the DL reception 622. In some aspects, 1104 may be performed by the BWP management component 198.

In some aspects, to perform the BWP operation for the communication with the network entity (at 1108), the UE may receive a BWP switch trigger for the BWP switch, and perform the BWP switch from an active wideband BWP to a pair of default DL/UL BWPs, which may include a default DL BWP and a default UL BWP. For example, referring to FIG. 6 and FIG. 9, the UE 902 may receive, at 912, a BWP switch trigger for the BWP switch, and perform, at 914, the BWP switch from an active wideband BWP (e.g., 640) to a pair of default DL/UL BWPs, which may include a default DL BWP and a default UL BWP.

In some aspects, the BWP switch trigger may be received via one of DCI, a MAC-CE, or an RRC reconfiguration. For example, referring to FIG. 9, the BWP switch trigger may be received, at 912, via one of DCI, a MAC-CE, or an RRC reconfiguration.

In some aspects, the BWP switch trigger may be based on a BWP inactivity timer. For example, referring to FIG. 9, the UE 902 may, at 913, monitor a BWP inactivity timer, and the BWP switch 962 may be triggered if the BWP inactivity timer expires.

In some aspects, at 1106, the UE may receive, via DCI or a MAC-CE, cross-BWP scheduling for the active wideband BWP and the pair of default DL/UL BWPs. The cross-BWP scheduling may include one or more of: dynamic scheduling for a PDSCH or a PUSCH, an activation of SPS, or a configured grant associated with the pair of default DL/UL BWPs. For example, referring to FIG. 9, the UE 902 may receive, at 910, via DCI or a MAC-CE, cross-BWP scheduling for the active wideband BWP (e.g., 640) and the pair of default DL/UL BWPs. The cross-BWP scheduling may include one or more of: dynamic scheduling for a PDSCH or a PUSCH, an activation of SPS, or a configured grant associated with the pair of default DL/UL BWPs. In some aspects, 1106 may be performed by the BWP management component 198.

In some aspects, the pair of default DL/UL BWPs may at least partially overlap the pair of unrestricted BWPs. For example, referring to FIG. 6, the pair of default DL/UL BWPs may at least partially overlap the pair of unrestricted BWPs (e.g., 610 and 620). Referring to FIG. 7, the set of default BWPs 702 may at least partially overlap the set of unrestricted BWPs 704.

In some aspects, to perform the BWP operation for the communication with the network entity (at 1108), the UE may perform the BWP switch from a wideband BWP to a default unrestricted DL BWP and a default unrestricted UL BWP. The default unrestricted DL BWP may be a first intersection of the default DL BWP with the unrestricted DL BWP, and the default unrestricted UL BWP may be a second intersection of the default UL BWP with the unrestricted UL BWP. For example, referring to FIG. 6, the UE may perform the BWP switch from a wideband BWP 640 to a default unrestricted DL BWP and a default unrestricted UL BWP. Referring to FIG. 7, the default unrestricted BWPs 706 may be the intersection of the default BWPs 702 with the unrestricted BWPs 704.

In some aspects, at 1112, based on a TA timer not running after the BWP switch, the UE may initiate an RA procedure to acquire an UL synchronization, and transmit, to the network entity via the unrestricted UL BWP, a UE ID to indicate the completion of the BWP switch. For example, referring to FIG. 6 and FIG. 9, based on a TA timer not running after the BWP switch (at 962), the UE 902 may, at 920, initiate an RA procedure to acquire an UL synchronization, and transmit, at 922, to the network entity (base station 904) via the unrestricted UL BWP (e.g., 610), a UE ID to indicate the completion of the BWP switch. In some aspects, 1112 may be performed by the BWP management component 198.

In some aspects, at 1110, based on the TA timer running after the BWP switch, the UE may transmit, to the network entity via a configured grant-PUSCH resource in the unrestricted UL BWP, the UE ID to indicate the completion of the BWP switch. For example, referring to FIG. 6 and FIG. 9, based on the TA timer running after the BWP switch (at 962), the UE 902 may transmit, at 922, to the network entity (base station 904) via a configured grant-PUSCH resource in the unrestricted UL BWP (e.g., 610), the UE ID to indicate the completion of the BWP switch. In some aspects, 1110 may be performed by the BWP management component 198.

In some aspects, to perform the BWP operation for the communication with the network entity (at 1108), the UE may perform the SDT with the network entity based on at least one of NCD-SSB or a TRS. For example, referring to FIG. 9, the UE 902 may perform the SDT 964 with the network entity (base station 904) based on at least one of NCD-SSB or a TRS.

In some aspects, the UE may change the RRC state. For example, at 1120, the UE may change the RRC state from one of the RRC connected state or the RRC inactive state to another one of the RRC connected state or the RRC inactive state. After the UE changed the RRC state, the UE may, at 1124, perform a second SDT with the network entity via the pair of unrestricted BWPs for the first SDT (at 1108). For example, referring to FIG. 9, the UE 902 may, at 926, change the RRC state from the RRC connected state to the RRC inactive state, or from the RRC inactive state to the RRC connected state. After the RRC state change at 926, the UE 902 may, at 930, perform a second SDT with the network entity (base station 904) via the pair of unrestricted BWPs (e.g., 610 and 620) for the first SDT (at 964). In some aspects, 1120 and 1124 may be performed by the BWP management component 198.

In some aspects, before the UE performs the second SDT with the network entity (at 1124), the UE may, at 1122, validate a TA based on the difference between a first RSRP measured before the change of the RRC state and a second RSRP measured after the change of the RRC state being less than or equal to a threshold. For example, referring to FIG. 9, the UE 902 may, at 928, validate a TA based on the difference between the RSRP measurements. Referring to FIG. 8, the TA validation may be based on a first RSRP measured (at 802) before the change of the RRC state at 810 and a second RSRP measured (at 804) after the change of the RRC state at 810. The TA may be validated if the difference between the RSRP measurements is less than or equal to a threshold. In some aspects, 1122 may be performed by the BWP management component 198.

In some aspects, at 1118, the UE may receive an indication of the threshold from the network entity. For example, referring to FIG. 9, the UE 902 may receive, at 924, an indication of the threshold from the network entity (base station 904). In some aspects, 1118 may be performed by the BWP management component 198.

Figure 12:
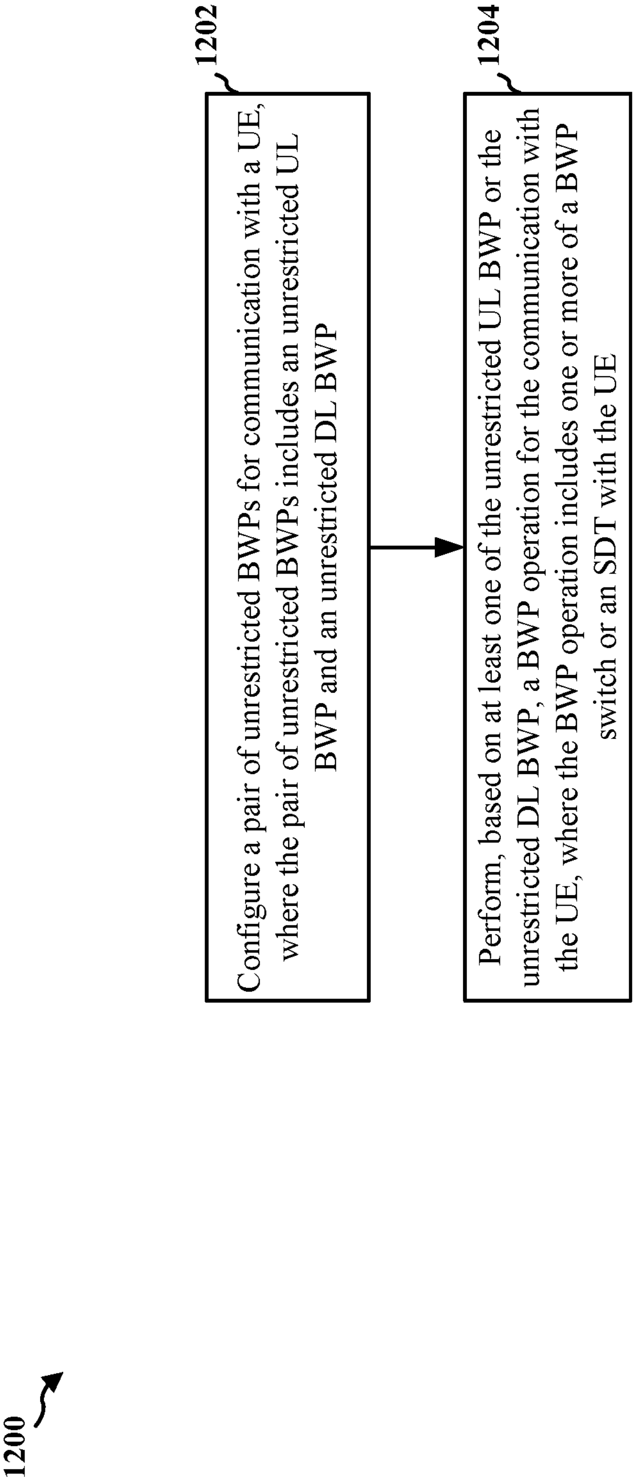
FIG. 12 is a flowchart illustrating methods of wireless communication at a network entity in accordance with various aspects of the present disclosure.

FIG. 12 is a flowchart 1200 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 604, 904; or the network entity 1402 in the hardware implementation of FIG. 14). The methods provide a configuration for a pair of unrestricted DL/UL BWPs, allowing for more flexibility in managing different UE types (e.g., eMBB, RedCap, eRedCap) and traffic, thereby reducing congestion and improving energy efficiency. The configuration of dedicated UL resources in the unrestricted UL BWP improves robustness and reduces latency in data/control communication, even when the UE is in power saving modes. Additionally, the methods provide a unified framework for power saving and traffic offloading from initial DL/UL BWPs in both connected and inactive states, leading to better utilization of frequency resources.

As shown in FIG. 12, at 1202, the network entity may configure a pair of unrestricted BWPs for communication with a UE. The pair of unrestricted BWPs may include an unrestricted UL BWP and an unrestricted DL BWP. The UE may be the UE 104, 350, 602, 902, or the apparatus 1404 in the hardware implementation of FIG. 14. FIGS. 6, 7, 8, and 9 illustrate various aspects of the steps in connection with flowchart 1200. For example, referring to FIG. 6 and FIG. 9, the network entity (base station 904) may, at 906, configure a pair of unrestricted BWPs for communication with a UE 902. The pair of unrestricted BWPs may include an unrestricted UL BWP 610 and an unrestricted DL BWP 620. In some aspects, 1202 may be performed by the BWP management component 199.

At 1204, the network entity may perform, based on at least one of the unrestricted UL BWP or the unrestricted DL BWP, a BWP operation for the communication with the UE. The BWP operation may include one or more of a BWP switch or an SDT with the UE. For example, referring to FIG. 9, the network entity (base station 904) may, at 914, perform, based on at least one of the unrestricted UL BWP (e.g., 610) or the unrestricted DL BWP (e.g., 620), a BWP operation for the communication with the UE 902. The BWP operation may include one or more of a BWP switch 962 or an SDT 964 with the UE 902. In some aspects, 1304 may be performed by the BWP management component 199.

Figure 13:
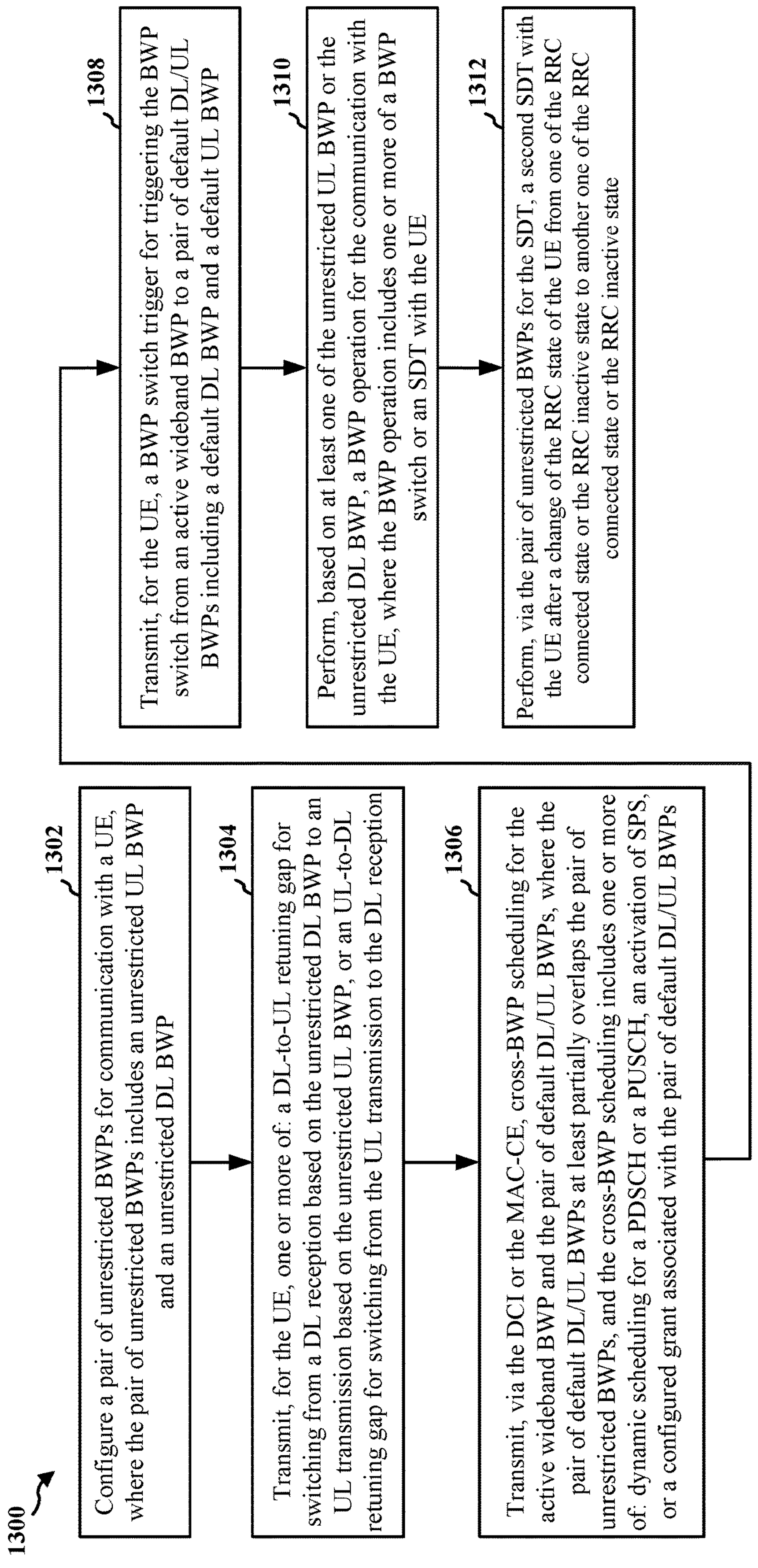
FIG. 13 is a flowchart illustrating methods of wireless communication at a network entity in accordance with various aspects of the present disclosure.

FIG. 13 is a flowchart 1300 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 604, 904; or the network entity 1402 in the hardware implementation of FIG. 14). The methods provide a configuration for a pair of unrestricted DL/UL BWPs, allowing for more flexibility in managing different UE types (e.g., eMBB, RedCap, eRedCap) and traffic, thereby reducing congestion and improving energy efficiency. The configuration of dedicated UL resources in the unrestricted UL BWP improves robustness and reduces latency in data/control communication, even when the UE is in power saving modes. Additionally, the methods provide a unified framework for power saving and traffic offloading from initial DL/UL BWPs in both connected and inactive states, leading to better utilization of frequency resources.

As shown in FIG. 13, at 1302, the network entity may configure a pair of unrestricted BWPs for communication with a UE. The pair of unrestricted BWPs may include an unrestricted UL BWP and an unrestricted DL BWP. The UE may be the UE 104, 350, 602, 902, or the apparatus 1404 in the hardware implementation of FIG. 14. FIGS. 6, 7, 8, and 9 illustrate various aspects of the steps in connection with flowchart 1300. For example, referring to FIG. 6 and FIG. 9, the network entity (base station 904) may, at 906, configure a pair of unrestricted BWPs for communication with a UE 902. The pair of unrestricted BWPs may include an unrestricted UL BWP 610 and an unrestricted DL BWP 620. In some aspects, 1302 may be performed by the BWP management component 199.

At 1310, the network entity may perform, based on at least one of the unrestricted UL BWP or the unrestricted DL BWP, a BWP operation for the communication with the UE. The BWP operation may include one or more of a BWP switch or an SDT with the UE. For example, referring to FIG. 9, the network entity (base station 904) may, at 914, perform, based on at least one of the unrestricted UL BWP (e.g., 610) or the unrestricted DL BWP (e.g., 620), a BWP operation for the communication with the UE 902. The BWP operation may include one or more of a BWP switch 962 or an SDT 964 with the UE 902. In some aspects, 1310 may be performed by the BWP management component 199.

In some aspects, the network entity may be one of a PCell of the UE, a PSCell of the UE, or a SCell of the UE. The RRC state of the UE may be the RRC connected state or the RRC inactive state if the network entity is the PCell, and the RRC state of the UE may be the RRC connected state if the network entity is the PSCell or the SCell. For example, referring to FIG. 9, the network entity (base station 904) may be one of a PCell 942 of the UE 902, a PSCell 944 of the UE 902, or a SCell 946 of the UE 902. The RRC state of the UE 902 may be the RRC connected state or the RRC inactive state if the network entity (base station 904) is the PCell 942, and the RRC state of the UE 902 may be the RRC connected state if the network entity (base station 904) is the PSCell 944 or the SCell 946.

In some aspects, the network entity may be one of the PCell, the PSCell, or a PUCCH SCell of the UE, and the unrestricted UL BWP may include one or more of: a PRACH resource, a PUCCH resource, an SRS resource, or a PUSCH resource. For example, referring to FIG. 6 and FIG. 9, the network entity (base station 904) may be one of the PCell 942, the PSCell 944, or a PUCCH SCell of the UE 902, and the unrestricted UL BWP 610 may include one or more of: a PRACH resource, a PUCCH resource, an SRS resource, or a PUSCH resource.

In some aspects, the unrestricted DL BWP may include dedicated PDCCH and PDSCH resources, and the unrestricted DL BWP may not include CORESET #0 and CD-SSB. For example, referring to FIG. 6, the unrestricted DL BWP 620 may include dedicated PDCCH and PDSCH resources, and the unrestricted DL BWP 620 may not include CORESET #0 and CD-SSB (e.g., 630).

In some aspects, the unrestricted UL BWP and the unrestricted DL BWP do not need to be aligned at the center frequency, regardless they are configured on TDD band, FDD band, or a hybrid of frequency bands with different duplex modes. For example, a first center frequency of the unrestricted DL BWP and a second center frequency of the unrestricted UL BWP may have a frequency gap greater than zero. For example, referring to FIG. 6, the center frequency $f_2$ of the unrestricted DL BWP 620 and the center frequency $f_1$ of the unrestricted UL BWP 610 may have a frequency gap greater than zero.

In some aspects, the network entity may, at 1304, transmit, for the UE, one or more of: a DL-to-UL retuning gap for switching from a DL reception based on the unrestricted DL BWP to an UL transmission based on the unrestricted UL BWP, or an UL-to-DL retuning gap for switching from the UL transmission to the DL reception. For example, referring to FIG. 6 and FIG. 9, the network entity (base station 904) may transmit, at 908, for the UE 902, one or more of: a DL-to-UL retuning gap for switching from a DL reception 622 based on the unrestricted DL BWP 620 to an UL transmission 612 based on the unrestricted UL BWP 610, or an UL-to-DL retuning gap for switching from the UL transmission 612 to the DL reception 622. In some aspects, 1304 may be performed by the BWP management component 199.

In some aspects, at 1308, the network entity may transmit, for the UE, a BWP switch trigger for the BWP switch from an active wideband BWP to a pair of default DL/UL BWPs including a default DL BWP and a default UL BWP. The transmission of the BWP switch trigger may be via one of: DCI, a MAC-CE, or an RRC reconfiguration. For example, referring to FIG. 9, the network entity (base station 904) may transmit, at 912, for the UE 902, a BWP switch trigger for the BWP switch from an active wideband BWP (e.g., 640) to a pair of default DL/UL BWPs including a default DL BWP and a default UL BWP. The transmission of the BWP switch trigger may be via one of: DCI, a MAC-CE, or an RRC reconfiguration. In some aspects, 1308 may be performed by the BWP management component 199.

In some aspects, at 1306, the network entity may transmit, via the DCI or the MAC-CE, cross-BWP scheduling for the active wideband BWP and the pair of default DL/UL BWPs. The pair of default DL/UL BWPs may at least partially overlap the pair of unrestricted BWPs, and the cross-BWP scheduling may include one or more of: dynamic scheduling for a PDSCH or a PUSCH, an activation of SPS, or a configured grant associated with the pair of default DL/UL BWPs. For example, referring to FIG. 9, the network entity (base station 904) may transmit, at 910, via the DCI or the MAC-CE, cross-BWP scheduling for the active wideband BWP (e.g., 640) and the pair of default DL/UL BWPs. The pair of default DL/UL BWPs may at least partially overlap the pair of unrestricted BWPs (e.g., 610 and 620), and the cross-BWP scheduling may include one or more of: dynamic scheduling for a PDSCH or a PUSCH, an activation of SPS, or a configured grant associated with the pair of default DL/UL BWPs. In some aspects, 1306 may be performed by the BWP management component 199.

In some aspects, to perform the BWP operation for the communication with the UE (at 1310), the network entity may perform the SDT with the UE based on at least one of NCD-SSB or a TRS. For example, referring to FIG. 9, the network entity (base station 904) may perform the SDT 964 with the UE 902 based on at least one of NCD-SSB or a TRS.

In some aspects, the RRC state of the UE may be one of the RRC connected state or the RRC inactive state, the SDT may be a first SDT. The network entity may, at 1312, perform, via the pair of unrestricted BWPs for the first SDT, a second SDT with the UE after the change of the RRC state of the UE to another one of the RRC connected state or the RRC inactive state. For example, referring to FIG. 9, the network entity (base station 904) may, at 930, perform, via the pair of unrestricted BWPs (e.g., 610 and 620) for the first SDT (at 964), a second SDT with the UE after the change of the RRC state of the UE 902 at 926. In some aspects, 1312 may be performed by the BWP management component 199.

Figure 14:
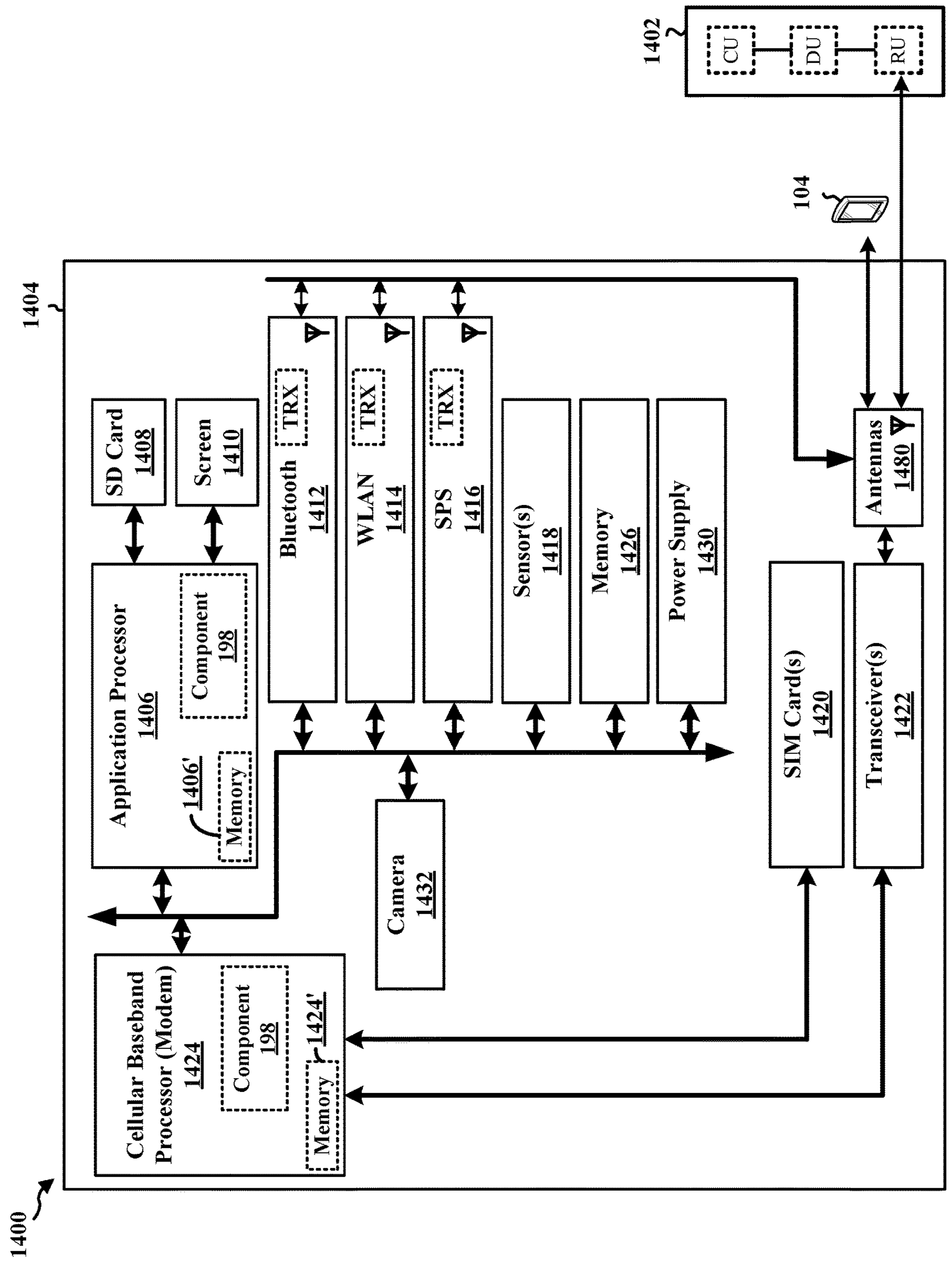
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor (or processing circuitry) 1424 (also referred to as a modem) coupled to one or more transceivers 1422 (e.g., cellular RF transceiver). The cellular baseband processor(s) (or processing circuitry) 1424 may include at least one on-chip memory (or memory circuitry) 1424'. In some aspects, the apparatus 1404 may further include one or more subscriber identity modules (SIM) cards 1420 and at least one application processor (or processing circuitry) 1406 coupled to a secure digital (SD) card 1408 and a screen 1410. The application processor(s) (or processing circuitry) 1406 may include on-chip memory (or memory circuitry) 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) (or processing circuitry) 1424 communicates through the transceiver(s) 1422 via one or more antennas 1480 with the UE 104 and/or with an RU associated with a network entity 1402. The cellular baseband processor(s) (or processing circuitry) 1424 and the application processor(s) (or processing circuitry) 1406 may each include a computer-readable medium/memory (or memory circuitry) 1424', 1406', respectively. The additional memory modules 1426 may also be considered a computer-readable medium/memory (or memory circuitry). Each computer-readable medium/memory (or memory circuitry) 1424', 1406', 1426 may be non-transitory. The cellular baseband processor(s) (or processing circuitry) 1424 and the application processor(s) (or processing circuitry) 1406 are each responsible for general processing, including the execution of software stored on the computer-readable medium/memory (or memory circuitry). The software, when executed by the cellular baseband processor(s) (or processing circuitry) 1424/application processor(s) (or processing circuitry) 1406, causes the cellular baseband processor(s) (or processing circuitry) 1424/application processor(s) (or processing circuitry) 1406 to perform the various functions described supra. The cellular baseband processor(s) (or processing circuitry) 1424 and the application processor(s) (or processing circuitry) 1406 are configured to perform the various functions described supra based at least in part of the information stored in the memory (or memory circuitry). That is, the cellular baseband processor(s) (or processing circuitry) 1424 and the application processor(s) (or processing circuitry) 1406 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1424/application processor(s) (or processing circuitry) 1406 when executing software. The cellular baseband processor(s) (or processing circuitry) 1424/application processor(s) (or processing circuitry) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) (or processing circuitry) 1424 and/or the application processor(s) (or processing circuitry) 1406, and in another configuration, the apparatus 1404 may be the entire UE (e.g., see UE 350 of FIG. 3) and include the additional modules of the apparatus 1404.

As discussed supra, the component 198 may be configured to configure a pair of unrestricted BWPs for communication with a network entity, where the pair of unrestricted BWPs includes an unrestricted UL BWP and an unrestricted DL BWP; and perform, based on at least one of the unrestricted UL BWP or the unrestricted DL BWP, a BWP operation for the communication with the network entity, where the BWP operation includes one or more of a BWP switch or an SDT. The component 198 may be further configured to perform any of the aspects described in connection with the flowcharts in FIG. 10 and FIG. 11, and/or performed by the UE 902 in FIG. 9. The component 198 may be within the cellular baseband processor(s) (or processing circuitry) 1424, the application processor(s) (or processing circuitry) 1406, or both the cellular baseband processor(s) (or processing circuitry) 1424 and the application processor(s) (or processing circuitry) 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) (or processing circuitry) 1424 and/or the application processor(s) (or processing circuitry) 1406, includes means for configuring a pair of unrestricted BWPs for communication with a network entity, where the pair of unrestricted BWPs includes an unrestricted UL BWP and an unrestricted DL BWP, and means for performing, based on at least one of the unrestricted UL BWP or the unrestricted DL BWP, a BWP operation for the communication with the network entity, where the BWP operation includes one or more of a BWP switch or an SDT. The apparatus 1404 may further include means for performing any of the aspects described in connection with the flowcharts in FIG. 10 and FIG. 11, and/or aspects performed by the UE 902 in FIG. 9. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
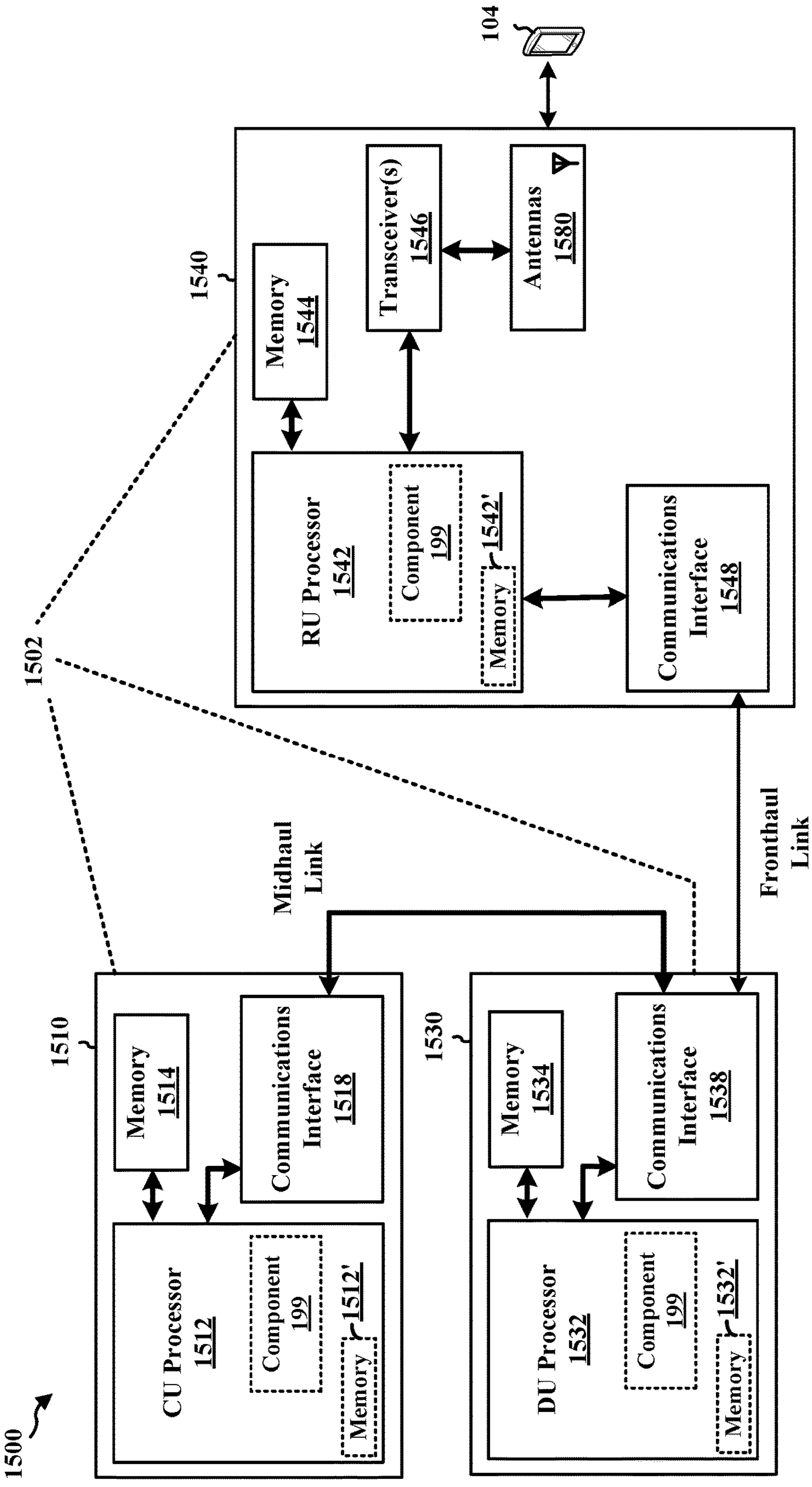
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include at least one CU processor (or processing circuitry) 1512. The CU processor(s) (or processing circuitry) 1512 may include on-chip memory (or memory circuitry) 1512'. In some aspects, the CU 1510 may further include additional memory modules 1514 and a communications interface 1518. The CU 1510 communicates with the DU 1530 through a midhaul link, such as an F1 interface. The DU 1530 may include at least one DU processor (or processing circuitry) 1532. The DU processor(s) (or processing circuitry) 1532 may include on-chip memory (or memory circuitry) 1532'. In some aspects, the DU 1530 may further include additional memory modules 1534 and a communications interface 1538. The DU 1530 communicates with the RU 1540 through a fronthaul link. The RU 1540 may include at least one RU processor (or processing circuitry) 1542. The RU processor(s) (or processing circuitry) 1542 may include on-chip memory (or memory circuitry) 1542'. In some aspects, the RU 1540 may further include additional memory modules 1544, one or more transceivers 1546, antennas 1580, and a communications interface 1548. The RU 1540 communicates with the UE 104. The on-chip memory (or memory circuitry) 1512', 1532', 1542' and the additional memory modules 1514, 1534, 1544 may each be considered a computer-readable medium/memory (or memory circuitry). Each computer-readable medium/memory (or memory circuitry) may be non-transitory. Each of the processors (or processing circuitry) 1512, 1532, 1542 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to configure a pair of unrestricted BWPs for communication with a UE, where the pair of unrestricted BWPs includes an unrestricted UL BWP and an unrestricted DL BWP; and perform, based on at least one of the unrestricted UL BWP or the unrestricted DL BWP, a BWP operation for the communication with the UE, where the BWP operation includes one or more of a BWP switch or an SDT. The component 199 may be further configured to perform any of the aspects described in connection with the flowcharts in FIG. 12 and FIG. 13, and/or performed by the base station 904 in FIG. 9. The component 199 may be within one or more processors (or processing circuitry) of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 includes means for configuring a pair of unrestricted BWPs for communication with a UE, where the pair of unrestricted BWPs includes an unrestricted UL BWP and an unrestricted DL BWP, and means for performing, based on at least one of the unrestricted UL BWP or the unrestricted DL BWP, a BWP operation for the communication with the UE, where the BWP operation includes one or more of a BWP switch or an SDT. The network entity 1502 may further include means for performing any of the aspects described in connection with the flowcharts in FIG. 12 and FIG. 13, and/or aspects performed by the base station 904 in FIG. 9. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include configuring a pair of unrestricted BWPs for communication with a network entity, where the pair of unrestricted BWPs includes an unrestricted UL BWP and an unrestricted DL BWP; and performing, based on at least one of the unrestricted UL BWP or the unrestricted DL BWP, a BWP operation for the communication with the network entity, where the BWP operation includes one or more of a BWP switch or an SDT. The methods provide a configuration for a pair of unrestricted DL/UL BWPs, allowing for more flexibility in managing different UE types (e.g., eMBB, RedCap, eRedCap) and traffic, thereby reducing congestion and improving energy efficiency. The configuration of dedicated UL resources in the unrestricted UL BWP improves robustness and reduces latency in data/control communication, even when the UE is in power saving modes. Additionally, the methods provide a unified framework for power saving and traffic offloading from initial DL/UL BWPs in both connected and inactive states, leading to better utilization of frequency resources.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C.

Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes configuring a pair of unrestricted bandwidth parts (BWPs) for communication with a network entity, wherein the pair of unrestricted BWPs includes an unrestricted uplink (UL) BWP and an unrestricted downlink (DL) BWP; and performing, based on at least one of the unrestricted UL BWP or the unrestricted DL BWP, a BWP operation for the communication with the network entity, wherein the BWP operation includes one or more of a BWP switch or a small data transmission (SDT) with the network entity.

Aspect 2 is the method of aspect 1, wherein the network entity is one of a primary cell (PCell) of the UE, a primary secondary cell (PSCell) of the UE, or a secondary cell (SCell) of the UE. The radio resource configuration (RRC) state of the UE is an RRC connected state or an RRC inactive state if the network entity is the PCell, and the RRC state of the UE is the RRC connected state if the network entity is the PSCell or the SCell.

Aspect 3 is the method of aspect 2, wherein the network entity is one of the PCell, the PSCell, or a physical uplink control channel (PUCCH) SCell of the UE, and the unrestricted UL BWP includes one or more of: a physical random access channel (PRACH) resource, a PUCCH resource, a sounding reference signal (SRS) resource, or a physical uplink shared channel (PUSCH) resource.

Aspect 4 is the method of aspect 2, wherein the unrestricted DL BWP includes dedicated physical downlink control channel (PDCCH) and physical downlink shared channel (PDSCH) resources, and the unrestricted DL BWP does not include control resource set (CORESET) zero (CORESET #0) and cell-defining (CD)-synchronization signal block (CD-SSB).

Aspect 5 is the method of any of aspects 1 to 4, wherein the method further includes: receiving, via a resource outside of the unrestricted DL BWP, a downlink (DL) reference signal (RS); and measuring the DL RS.

Aspect 6 is the method of any of aspects 1 to 2, wherein a first center frequency of the unrestricted DL BWP and a second center frequency of the unrestricted UL BWP have a frequency gap greater than zero.

Aspect 7 is the method of any of aspects 1 to 2, wherein the method further includes receiving, from the network entity, one or more of: a DL-to-UL retuning gap for switching from a DL reception based on the unrestricted DL BWP to an UL transmission based on the unrestricted UL BWP, or an UL-to-DL retuning gap for switching from the UL transmission to the DL reception.

Aspect 8 is the method of any of aspects 1 to 2, wherein performing the BWP operation for the communication with the network entity includes receiving a BWP switch trigger for the BWP switch; and performing the BWP switch from an active wideband BWP to a pair of default DL/UL BWPs comprising a default DL BWP and a default UL BWP.

Aspect 9 is the method of aspect 8, wherein receiving the BWP switch trigger includes receiving the BWP switch trigger via one of: downlink control information (DCI), a medium access control (MAC)-control element (MAC-CE), or an RRC reconfiguration.

Aspect 10 is the method of aspect 8, wherein the BWP switch trigger is based on a BWP inactivity timer.

Aspect 11 is the method of any of aspects 8 to 10, wherein the method further includes receiving, via downlink control information (DCI) or a medium access control (MAC)-control element (MAC-CE), cross-BWP scheduling for the active wideband BWP and the pair of default DL/UL BWPs, wherein the cross-BWP scheduling includes one or more of: dynamic scheduling for a physical downlink shared channel (PDSCH) or a physical uplink shared channel (PUSCH), an activation of semi-persistent scheduling (SPS), or a configured grant associated with the pair of default DL/UL BWPs.

Aspect 12 is the method of aspect 11, wherein the pair of default DL/UL BWPs at least partially overlaps the pair of unrestricted BWPs.

Aspect 13 is the method of aspect 12, wherein performing the BWP operation for the communication with the network entity includes performing the BWP switch from a wideband BWP to a default unrestricted DL BWP and a default unrestricted UL BWP, wherein the default unrestricted DL BWP is a first intersection of the default DL BWP with the unrestricted DL BWP, and the default unrestricted UL BWP is a second intersection of the default UL BWP with the unrestricted UL BWP.

Aspect 14 is the method of aspect 13, wherein the method further includes: initiating, based on a timing alignment (TA) timer not running after the BWP switch, a random access (RA) procedure to acquire an UL synchronization, and transmitting, to the network entity via the unrestricted UL BWP, a UE identifier (ID) to indicate the completion of the BWP switch; or transmitting, to the network entity via a configured grant-PUSCH resource in the unrestricted UL BWP and based on the TA timer running after the BWP switch, the UE ID to indicate the completion of the BWP switch.

Aspect 15 is the method of any of aspects 1 to 2, wherein performing the BWP operation for the communication with the network entity includes performing the SDT with the network entity based on at least one of non-cell-defining (NCD)-synchronization signal block (NCD-SSB) or a tracking reference signal (TRS).

Aspect 16 is the method of aspect 15, wherein the RRC state of the UE is one of the RRC connected state or the RRC inactive state, wherein the SDT is a first SDT, and wherein the method further includes changing the RRC state of the UE to another one of the RRC connected state or the RRC inactive state; and performing a second SDT with the network entity via the pair of unrestricted BWPs for the first SDT.

Aspect 17 is the method of aspect 16, wherein the method further includes validating, prior to the performance of the second SDT with the network entity, a timing alignment (TA) based on a difference between a first reference signal received power (RSRP) measured before a change of the RRC state and a second RSRP measured after the change of the RRC state is less than or equal to a threshold.

Aspect 18 is the method of aspect 17, wherein the method further includes receiving, from the network entity, an indication of the threshold.

Aspect 19 is an apparatus for wireless communication at a UE, comprising: a processing system that includes processor circuitry and memory circuitry that stores code and is coupled with the processor circuitry, the processing system configured to cause the UE to perform the method of one or more of aspects 1-18.

Aspect 20 is an apparatus for wireless communication at a UE, comprising: at least one memory; and at least one processor coupled to the at least one memory and, where the at least one processor, individually or in any combination, is configured to perform the method of any of aspects 1-18.

Aspect 21 is the apparatus for wireless communication at a UE, comprising means for performing each step in the method of any of aspects 1-18.

Aspect 22 is an apparatus of any of aspects 19-21, further comprising a transceiver configured to receive or to transmit in association with the method of any of aspects 1-18.

Aspect 23 is a computer-readable medium (e.g., a non-transitory computer-readable medium) storing computer executable code at a UE, the code when executed by at least one processor causes the at least one processor to, individually or in any combination, perform the method of any of aspects 1-18.

Aspect 24 is a method of wireless communication at a network entity. The method includes configuring a pair of unrestricted bandwidth parts (BWPs) for communication with a user equipment (UE), wherein the pair of unrestricted BWPs includes an unrestricted uplink (UL) BWP and an unrestricted downlink (DL) BWP; and performing, based on at least one of the unrestricted UL BWP or the unrestricted DL BWP, a BWP operation for the communication with the UE, wherein the BWP operation includes one or more of a BWP switch or a small data transmission (SDT) with the UE.

Aspect 25 is the method of aspect 24, wherein the network entity is one of a primary cell (PCell) of the UE, a primary secondary cell (PSCell) of the UE, or a secondary cell (SCell) of the UE, and wherein a radio resource configuration (RRC) state of the UE is an RRC connected state or an RRC inactive state if the network entity is the PCell, and the RRC state of the UE is the RRC connected state if the network entity is the PSCell or the SCell.

Aspect 26 is the method of aspect 25, wherein the network entity is one of the PCell, the PSCell, or a physical uplink control channel (PUCCH) SCell of the UE, and the unrestricted UL BWP includes one or more of: a physical random access channel (PRACH) resource, a PUCCH resource, a sounding reference signal (SRS) resource, or a physical uplink shared channel (PUSCH) resource.

Aspect 27 is the method of aspect 25, wherein the unrestricted DL BWP includes dedicated physical downlink control channel (PDCCH) and physical downlink shared channel (PDSCH) resources, and the unrestricted DL BWP does not include control resource set (CORESET) zero (CORESET #0) and cell-defining (CD)-synchronization signal block (CD-SSB).

Aspect 28 is the method of any of aspects 24 to 25, wherein a first center frequency of the unrestricted DL BWP and a second center frequency of the unrestricted UL BWP have a frequency gap greater than zero.

Aspect 29 is the method of any of aspects 24 to 25, wherein the method further includes transmitting, for the UE, one or more of: a DL-to-UL retuning gap for switching from a DL reception based on the unrestricted DL BWP to an UL transmission based on the unrestricted UL BWP, or an UL-to-DL retuning gap for switching from the UL transmission to the DL reception.

Aspect 30 is the method of any of aspects 24 to 25, wherein the method further includes transmitting, for the UE, a BWP switch trigger for the BWP switch from an active wideband BWP to a pair of default DL/UL BWPs comprising a default DL BWP and a default UL BWP, wherein the transmission of the BWP switch trigger is via one of: downlink control information (DCI), a medium access control (MAC)-control element (MAC-CE), or an RRC reconfiguration.

Aspect 31 is the method of aspect 30, wherein the method further includes transmitting, via the DCI or the MAC-CE, cross-BWP scheduling for the active wideband BWP and the pair of default DL/UL BWPs, wherein the pair of default DL/UL BWPs at least partially overlaps the pair of unrestricted BWPs, and wherein the cross-BWP scheduling includes one or more of: dynamic scheduling for a physical downlink shared channel (PDSCH) or a physical uplink shared channel (PUSCH), an activation of semi-persistent scheduling (SPS), or a configured grant associated with the pair of default DL/UL BWPs.

Aspect 32 is the method of any of aspects 24 to 25, wherein performing the BWP operation for the communication with the UE includes performing the SDT with the UE based on at least one of non-cell-defining (NCD)-synchronization signal block (NCD-SSB) or a tracking reference signal (TRS).

Aspect 33 is the method of aspect 32, wherein the RRC state of the UE is one of the RRC connected state or the RRC inactive state, the SDT is a first SDT, and wherein the method further includes performing, via the pair of unrestricted BWPs for the first SDT, a second SDT with the UE after a change of the RRC state of the UE to another one of the RRC connected state or the RRC inactive state.

Aspect 34 is an apparatus for wireless communication at a network entity, comprising: a processing system that includes processor circuitry and memory circuitry that stores code and is coupled with the processor circuitry, the processing system configured to cause the network entity to perform the method of one or more of aspects 24-33.

Aspect 35 is an apparatus for wireless communication at a network entity, comprising: at least one memory; and at least one processor coupled to the at least one memory and, where the at least one processor, individually or in any combination, is configured to perform the method of any of aspects 24-33.

Aspect 36 is the apparatus for wireless communication at a network entity, comprising means for performing each step in the method of any of aspects 24-33.

Aspect 37 is an apparatus of any of aspects 34-36, further comprising a transceiver configured to receive or to transmit in association with the method of any of aspects 24-33.

Aspect 38 is a computer-readable medium (e.g., a non-transitory computer-readable medium) storing computer executable code at a network entity, the code when executed by at least one processor causes the at least one processor to, individually or in any combination, perform the method of any of aspects 24-33.

What is claimed is:

1. An apparatus for wireless communication at a user equipment (UE), comprising:
- at least one memory; and
- at least one processor coupled to the at least one memory and, based at least in part on information stored in the at least one memory, the at least one processor is configured to:
  - configure a pair of unrestricted bandwidth parts (BWPs) for communication with a network entity, wherein the pair of unrestricted BWPs includes an unrestricted uplink (UL) BWP and an unrestricted downlink (DL) BWP;
  - receive, via downlink control information (DCI) or a medium access control (MAC)-control element (MAC-CE), cross-BWP scheduling for an active wideband BWP and a pair of default DL/UL BWPs, wherein the cross-BWP scheduling includes one or more of:
    - dynamic scheduling for a physical downlink shared channel (PDSCH) or a physical uplink shared channel (PUSCH),
    - an activation of semi-persistent scheduling (SPS), or
    - a configured grant associated with the pair of default DL/UL BWPs; and
  - perform, based on at least one of the unrestricted UL BWP or the unrestricted DL BWP, a BWP operation for the communication with the network entity, wherein the BWP operation includes one or more of a BWP switch from the active wideband BWP to the pair of default DL/UL BWPs comprising a default DL BWP and a default UL BWP.

2. The apparatus of claim 1, further comprising a transceiver coupled to the at least one processor, wherein to perform the BWP operation for the communication with the network entity, the at least one processor is configured to perform the BWP operation via the transceiver, wherein the network entity is one of a primary cell (PCell) of the UE, a primary secondary cell (PSCell) of the UE, or a secondary cell (SCell) of the UE, and wherein a radio resource configuration (RRC) state of the UE is an RRC connected state or an RRC inactive state if the network entity is the PCell, and the RRC state of the UE is the RRC connected state if the network entity is the PSCell or the SCell.

3. The apparatus of claim 2, wherein the network entity is one of the PCell, the PSCell, or a physical uplink control channel (PUCCH) SCell of the UE, and wherein the unrestricted UL BWP includes one or more of:
- a physical random access channel (PRACH) resource,
- a PUCCH resource,
- a sounding reference signal (SRS) resource, or
- a PUSCH resource.

4. The apparatus of claim 2, wherein the unrestricted DL BWP includes dedicated physical downlink control channel (PDCCH) and PDSCH resources, and the unrestricted DL BWP does not include control resource set (CORESET) zero (CORESET #0) and cell-defining (CD)-synchronization signal block (CD-SSB).

5. The apparatus of claim 4, wherein the at least one processor is further configured to:
- receive, via a resource outside of the unrestricted DL BWP, a DL reference signal (RS); and
- measure the DL RS.

6. The apparatus of claim 2, wherein a first center frequency of the unrestricted DL BWP and a second center frequency of the unrestricted UL BWP have a frequency gap greater than zero.

7. The apparatus of claim 2, wherein the at least one processor is further configured to:
- receive, from the network entity, one or more of:
  - a DL-to-UL retuning gap for switching from a DL reception based on the unrestricted DL BWP to an UL transmission based on the unrestricted UL BWP, or
  - an UL-to-DL retuning gap for switching from the UL transmission to the DL reception.

8. The apparatus of claim 2, wherein to perform the BWP operation for the communication with the network entity, the at least one processor is further configured to:
- receive a BWP switch trigger for the BWP switch.

9. The apparatus of claim 8, wherein to receive the BWP switch trigger, the at least one processor is configured to:
- receive the BWP switch trigger via one of:
  - DCI,
  - a MAC-CE, or
  - an RRC reconfiguration.

10. The apparatus of claim 8, wherein the BWP switch trigger is based on a BWP inactivity timer.

11. The apparatus of claim 1, wherein the pair of default DL/UL BWPs at least partially overlaps the pair of unrestricted BWPs.

12. The apparatus of claim 11, wherein to perform the BWP operation for the communication with the network entity, the at least one processor is configured to:
- perform the BWP switch from a wideband BWP to a default unrestricted DL BWP and a default unrestricted UL BWP, wherein the default unrestricted DL BWP is a first intersection of the default DL BWP with the unrestricted DL BWP, and the default unrestricted UL BWP is a second intersection of the default UL BWP with the unrestricted UL BWP.

13. The apparatus of claim 12, wherein the at least one processor is further configured to:
- initiate, based on a timing alignment (TA) timer not running after the BWP switch, a random access (RA) procedure to acquire an UL synchronization, and transmit, to the network entity via the unrestricted UL BWP, a UE identifier (ID) to indicate a completion of the BWP switch; or transmit, to the network entity via a configured grant-PUSCH resource in the unrestricted UL BWP and based on the TA timer running after the BWP switch, the UE ID to indicate the completion of the BWP switch.

14. An apparatus for wireless communication at a user equipment (UE), comprising:

at least one memory; and at least one processor coupled to the at least one memory and, based at least in part on information stored in the at least one memory, the at least one processor is configured to:

configure a pair of unrestricted bandwidth parts (BWPs) for communication with a network entity, wherein the pair of unrestricted BWPs includes an unrestricted uplink (UL) BWP and an unrestricted downlink (DL) BWP;

perform, based on at least one of the unrestricted UL BWP or the unrestricted DL BWP, a first small data transmission (SDT) with the network entity based on at least one of non-cell-defining (NCD)-synchronization signal block (NCD-SSB) or a tracking reference signal (TRS), wherein a radio resource configuration (RRC) state of the UE is one of an RRC connected state or an RRC inactive state, change the RRC state of the UE to another one of the RRC connected state or the RRC inactive state;

validate a timing alignment (TA) based on a difference between a first reference signal received power (RSRP) measured before a change of the RRC state and a second RSRP measured after the change of the RRC state being less than or equal to a threshold; and perform a second SDT with the network entity via the pair of unrestricted BWPs for the first SDT.

15. The apparatus of claim 14, wherein the at least one processor is further configured to:

receive, from the network entity, an indication of the threshold.

16. The apparatus of claim 14, wherein the network entity is one of a primary cell (PCell) of the UE, a primary secondary cell (PSCell) of the UE, or a secondary cell (SCell) of the UE, and wherein the RRC state of the UE is the RRC connected state or the RRC inactive state if the network entity is the PCell, and the RRC state of the UE is the RRC connected state if the network entity is the PSCell or the SCell.

17. The apparatus of claim 16, wherein the network entity is one of the PCell, the PSCell, or a physical uplink control channel (PUCCH) SCell of the UE, and wherein the unrestricted UL BWP includes one or more of:

a physical random access channel (PRACH) resource, a PUCCH resource, a sounding reference signal (SRS) resource, or a PUSCH resource.

18. The apparatus of claim 16, wherein the unrestricted DL BWP includes dedicated physical downlink control channel (PDCCH) and PDSCH resources, and the unrestricted DL BWP does not include control resource set (CORESET) zero (CORESET #0) and cell-defining (CD)-synchronization signal block (CD-SSB).

19. The apparatus of claim 18, wherein the at least one processor is further configured to:

receive, via a resource outside of the unrestricted DL BWP, a DL reference signal (RS); and measure the DL RS.

20. The apparatus of claim 16, wherein a first center frequency of the unrestricted DL BWP and a second center frequency of the unrestricted UL BWP have a frequency gap greater than zero.

21. An apparatus for wireless communication at a network entity, comprising:

at least one memory; and at least one processor coupled to the at least one memory and, based at least in part on information stored in the at least one memory, the at least one processor is configured to:

configure a pair of unrestricted bandwidth parts (BWPs) for communication with a user equipment (UE), wherein the pair of unrestricted BWPs includes an unrestricted uplink (UL) BWP and an unrestricted downlink (DL) BWP;

transmit, via downlink control information (DCI) or a medium access control (MAC)-control element (MAC-CE), cross-BWP scheduling for an active wideband BWP and a pair of default DL/UL BWPs, wherein the pair of default DL/UL BWPs at least partially overlaps the pair of unrestricted BWPs, wherein the cross-BWP scheduling includes one or more of:

dynamic scheduling for a physical downlink shared channel (PDSCH) or a physical uplink shared channel (PUSCH), an activation of semi-persistent scheduling (SPS), or a configured grant associated with the pair of default DL/UL BWPs;

transmit, for the UE, a BWP switch trigger for the BWP switch from the active wideband BWP to the pair of default DL/UL BWPs comprising a default DL BWP and a default UL BWP; and perform, based on at least one of the unrestricted UL BWP or the unrestricted DL BWP, a BWP operation for the communication with the UE, wherein the BWP operation includes one or more of a BWP switch or a small data transmission (SDT) with the UE.

22. The apparatus of claim 21, further comprising a transceiver coupled to the at least one processor, wherein to perform the BWP operation for the communication with the UE, the at least one processor is configured to perform the BWP operation via the transceiver, wherein the network entity is one of a primary cell (PCell) of the UE, a primary secondary cell (PSCell) of the UE, or a secondary cell (SCell) of the UE, and wherein a radio resource configuration (RRC) state of the UE is an RRC connected state or an RRC inactive state if the network entity is the PCell, and the RRC state of the UE is the RRC connected state if the network entity is the PSCell or the SCell.

23. The apparatus of claim 22, wherein the network entity is one of the PCell, the PSCell, or a physical uplink control channel (PUCCH) SCell of the UE, and the unrestricted UL BWP includes one or more of:

a physical random access channel (PRACH) resource, a PUCCH resource, a sounding reference signal (SRS) resource, or a physical uplink shared channel (PUSCH) resource.

24. The apparatus of claim 22, wherein the unrestricted DL BWP includes dedicated physical downlink control channel (PDCCH) and physical downlink shared channel (PDSCH) resources, and the unrestricted DL BWP does not include control resource set (CORESET) zero (CORESET #0) and cell-defining (CD)-synchronization signal block (CD-SSB).

25. The apparatus of claim 22, wherein a first center frequency of the unrestricted DL BWP and a second center frequency of the unrestricted UL BWP have a frequency gap greater than zero.

26. The apparatus of claim 22, wherein the at least one processor is further configured to:

transmit, for the UE, one or more of:

a DL-to-UL retuning gap for switching from a DL reception based on the unrestricted DL BWP to an UL transmission based on the unrestricted UL BWP, or an UL-to-DL retuning gap for switching from the UL transmission to the DL reception.

27. The apparatus of claim 22, wherein the transmission of the BWP switch trigger is via one of:

DCI, a MAC-CE, or an RRC reconfiguration.

28. The apparatus of claim 22, wherein to perform the BWP operation for the communication with the UE, the at least one processor is configured to:

perform the SDT with the UE based on at least one of non-cell-defining (NCD)-synchronization signal block (NCD-SSB) or a tracking reference signal (TRS).

29. The apparatus of claim 28, wherein the RRC state of the UE is one of the RRC connected state or the RRC inactive state, the SDT is a first SDT, and wherein the at least one processor is further configured to:

perform, via the pair of unrestricted BWPs for the first SDT, a second SDT with the UE after a change of the RRC state of the UE to another one of the RRC connected state or the RRC inactive state.

30. A method of wireless communication at a user equipment (UE), comprising:

configuring a pair of unrestricted bandwidth parts (BWPs) for communication with a network entity, wherein the pair of unrestricted BWPs includes an unrestricted uplink (UL) BWP and an unrestricted downlink (DL) BWP;

receiving, via downlink control information (DCI) or a medium access control (MAC)-control element (MAC-CE), cross-BWP scheduling for an active wideband BWP and a pair of default DL/UL BWPs, wherein the cross-BWP scheduling includes one or more of:

dynamic scheduling for a physical downlink shared channel (PDSCH) or a physical uplink shared channel (PUSCH), an activation of semi-persistent scheduling (SPS), or a configured grant associated with the pair of default DL/UL BWPs; and performing, based on at least one of the unrestricted UL BWP or the unrestricted DL BWP, a BWP operation for the communication with the network entity, wherein the BWP operation includes a BWP switch from the active wideband BWP to the pair of default DL/UL BWPs comprising a default DL BWP and a default UL BWP.

* * * * *